(12) United States Patent
Shidrameshetra et al.

(10) Patent No.: US 12,053,826 B2
(45) Date of Patent: Aug. 6, 2024

(54) CUTTING TOOL HOLDER WITH IMPROVED DAMPENING EFFECT

(71) Applicant: Kennametal Inc., Latrobe, PA (US)

(72) Inventors: Iranna Shidrameshetra, Bangalore (IN); Satish Chinnakar, Bangalore (IN); Igor Kaufmann, Fuerth (DE); Yogesh Basavaraju, Bangalore (IN)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 17/882,970

(22) Filed: Aug. 8, 2022

(65) Prior Publication Data

US 2022/0371102 A1 Nov. 24, 2022

Related U.S. Application Data

(63) Continuation of application No. 16/916,348, filed on Jun. 30, 2020, now Pat. No. 11,534,834.

(30) Foreign Application Priority Data

Jul. 17, 2019 (IN) .............................. 201941028864

(51) Int. Cl.
*B23B 27/08* (2006.01)
*B23B 27/00* (2006.01)
*B23B 29/04* (2006.01)

(52) U.S. Cl.
CPC ............ *B23B 27/002* (2013.01); *B23B 27/08* (2013.01); *B23B 29/043* (2013.01); *B23B 2205/02* (2013.01); *B23B 2250/16* (2013.01)

(58) Field of Classification Search
CPC . B23B 27/002; B23B 29/022; B23B 2250/16; B23B 2251/70; Y10T 408/76
See application file for complete search history.

(56) References Cited

U.S. PATENT DOCUMENTS

| | | | |
|---|---|---|---|
| 3,663,116 A | 5/1972 | Muller et al. | |
| 3,923,414 A | 12/1975 | Hopkins | |
| 4,706,788 A | 11/1987 | Inman et al. | |
| 5,112,164 A | 5/1992 | Pano | |
| 6,113,319 A | 9/2000 | Hansson et al. | |
| 7,028,997 B2 | 4/2006 | Takahashi et al. | |

(Continued)

FOREIGN PATENT DOCUMENTS

| | | |
|---|---|---|
| CN | 105817680 A | 8/2016 |
| CN | 106994519 A | 8/2017 |

(Continued)

OTHER PUBLICATIONS

May 3, 2021 Office Action (non-US) DE Application No. 102020115678.2, 20 Pages.

(Continued)

*Primary Examiner* — Ryan Rufo
(74) *Attorney, Agent, or Firm* — Christopher J. Owens

(57) ABSTRACT

Cutting tool holders are disclosed that include vibration dampening elements. The vibration dampening elements may extend parallel to a longitudinal plane of the cutting tool holder. The vibration dampening elements allow the cutting tool holders to have a smaller width while still providing higher grooving depth.

20 Claims, 22 Drawing Sheets

(56) References Cited

U.S. PATENT DOCUMENTS

| | | | | |
|---|---|---|---|---|
| 7,128,501 | B1 * | 10/2006 | Sipos | ............ B23B 27/167 407/100 |
| 8,371,776 | B2 * | 2/2013 | Lin | ............ B23B 27/002 82/158 |
| 9,168,594 | B2 * | 10/2015 | Guo | ............ B23C 5/26 |
| 9,221,141 | B1 * | 12/2015 | Xu | ............ B23Q 11/0035 |
| 9,616,502 | B2 * | 4/2017 | Hecht | ............ B23B 29/12 |
| 9,630,258 | B2 | 4/2017 | McCormick et al. | |
| 9,993,876 | B2 * | 6/2018 | Hecht | ............ B23B 29/12 |
| 10,953,471 | B2 | 3/2021 | Herman et al. | |
| 11,000,903 | B2 | 5/2021 | Thelin et al. | |
| 2004/0028490 | A1 | 2/2004 | Bergholt et al. | |
| 2005/0279598 | A1 | 12/2005 | McPherson | |
| 2007/0089574 | A1 * | 4/2007 | Murakami | ............ B23B 29/022 82/158 |
| 2007/0207671 | A1 | 9/2007 | Nagaya et al. | |
| 2010/0061822 | A1 | 3/2010 | Gerber | |
| 2010/0158621 | A1 | 6/2010 | Zitzlaff et al. | |
| 2011/0110732 | A1 | 5/2011 | Elbaz et al. | |
| 2011/0116883 | A1 | 5/2011 | Lin | |
| 2013/0129437 | A1 | 5/2013 | Sevdic et al. | |
| 2015/0056025 | A1 | 2/2015 | Guo et al. | |
| 2016/0045960 | A1 | 2/2016 | Hecht | |
| 2016/0107242 | A1 | 4/2016 | McCormick et al. | |
| 2017/0173701 | A1 | 6/2017 | Hecht et al. | |
| 2017/0282255 | A1 * | 10/2017 | Luik | ............ B23B 27/1666 |
| 2022/0258251 | A1 * | 8/2022 | Wu | ............ B23B 29/043 |

FOREIGN PATENT DOCUMENTS

| | | | | |
|---|---|---|---|---|
| CN | 108367365 | A | | 8/2018 |
| CN | 108778581 | A | | 11/2018 |
| DE | 2302732 | A1 | | 7/1973 |
| DE | 2302732 | C2 | | 4/1985 |
| EP | 0812641 | A1 | * | 12/1997 |
| EP | 1535682 | A1 | | 6/2005 |
| JP | S6176251 | A | | 4/1986 |
| JP | S61257702 | A | | 11/1986 |
| JP | 108252715 | A | | 10/1996 |
| JP | H09300111 | A | | 11/1997 |
| JP | 2002079405 | A | | 3/2002 |
| JP | 2003062703 | A | | 3/2003 |
| JP | 2003062704 | A | | 3/2003 |
| JP | 2003334702 | A | * | 11/2003 |
| JP | 2003334702 | A | | 11/2003 |
| JP | 2004202648 | A | * | 7/2004 |
| JP | 2004202648 | A | | 7/2004 |
| JP | 2005305600 | A | | 11/2005 |
| JP | 2011042007 | A | * | 3/2011 |
| JP | 2011042007 | A | | 3/2011 |
| KR | 20110011200 | A | * | 2/2011 |
| KR | 20120069195 | A | * | 6/2012 |
| RU | 001816538 | A1 | | 5/1993 |
| RU | 2005000 | C1 | | 12/1993 |
| RU | 2011478 | C1 | | 4/1994 |
| RU | 178436 | U1 | | 4/2018 |
| RU | 178436 | U1 | * | 4/2018 |
| SU | 418279 | A1 | | 3/1974 |
| SU | 649514 | A1 | | 2/1979 |
| SU | 1553329 | A2 | | 3/1990 |
| WO | 2012084688 | A1 | | 6/2012 |
| WO | WO-2017138881 | A1 | * | 8/2017 ............ B32B 27/002 |

OTHER PUBLICATIONS

Description of Japanese Application No. JP20020141136, JP2003334702A (Translation), Retrieved from URL: https://worldwide.espacenet.com/ (last visited Mar. 17, 2022), 12 pages.

Description of Japanese Application No. JP20020376763, JP2004202648A (Translation), Retrieved from URL: https://worldwide.espacenet.com/ (last visited Mar. 17, 2022), 12 pages.

Mar. 22, 2022 Office action (3 months) (US Only) US App. No. 20210016359A1, 12 pages.

Jun. 20, 2022 Final Office Action (US Only) US App. No. 20210016359A1, 11 pages.

Aug. 5, 2022 Advisory Action (PTOL-303) 1 US App. No. 20210016359A1, 6 pages.

Notice of Allowance U.S. Appl. No. 16/916,348, 11 Pages.

Apr. 12, 2023 Foreign Office Action Chinese Application No. CN202010516744.4, 20 Pages.

Foreign Office Action Chinese Application No. CN202010516744, 22 Pages.

Mar. 21, 2024 Foreign Office Action Chinese Application No. CN202010516744.4, 5 pages.

* cited by examiner

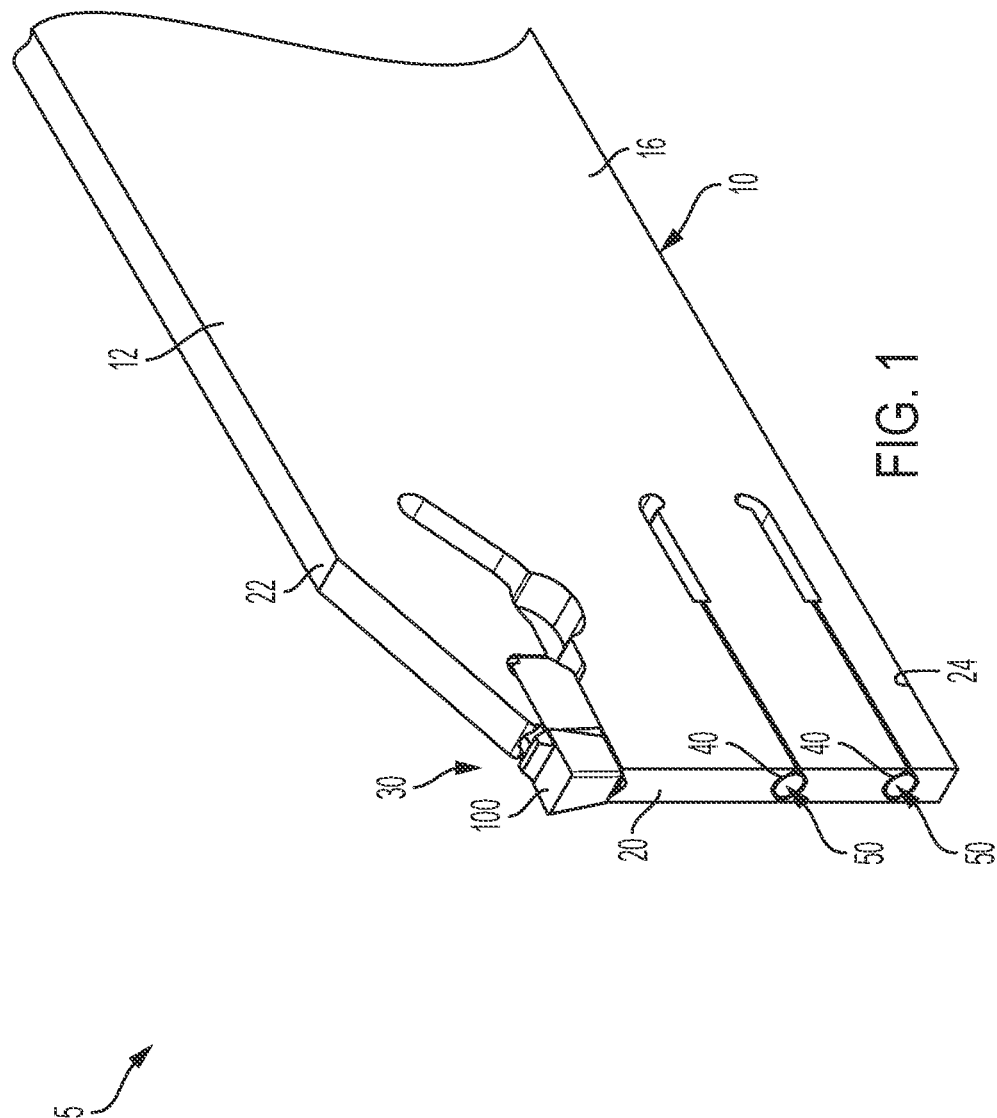

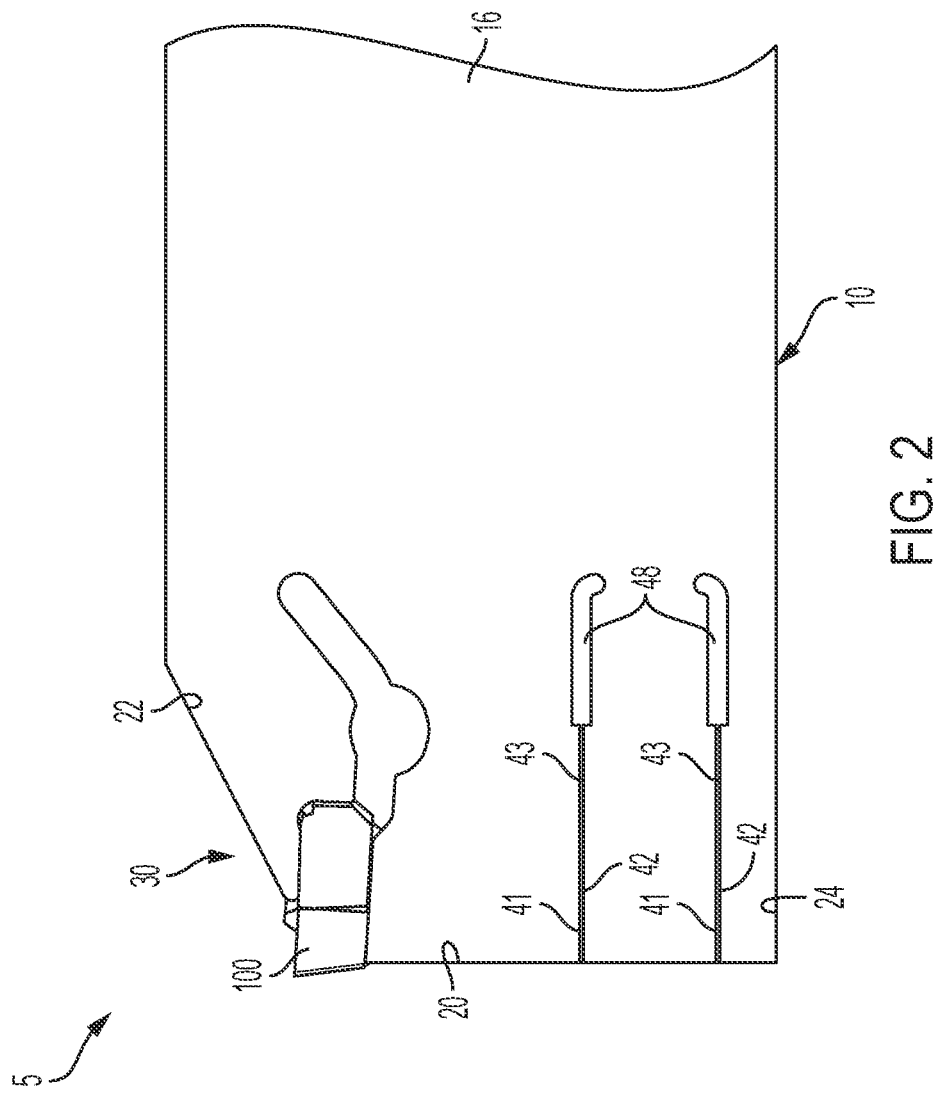

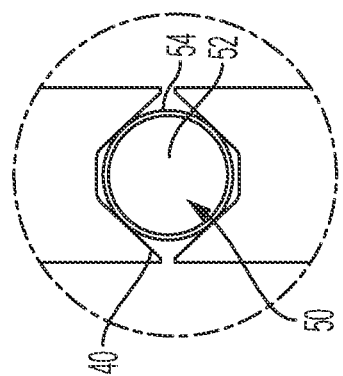
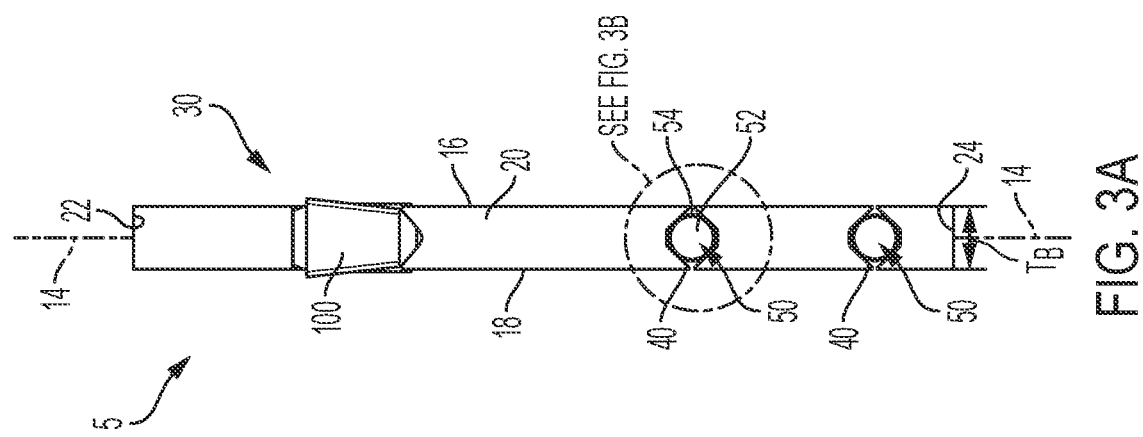

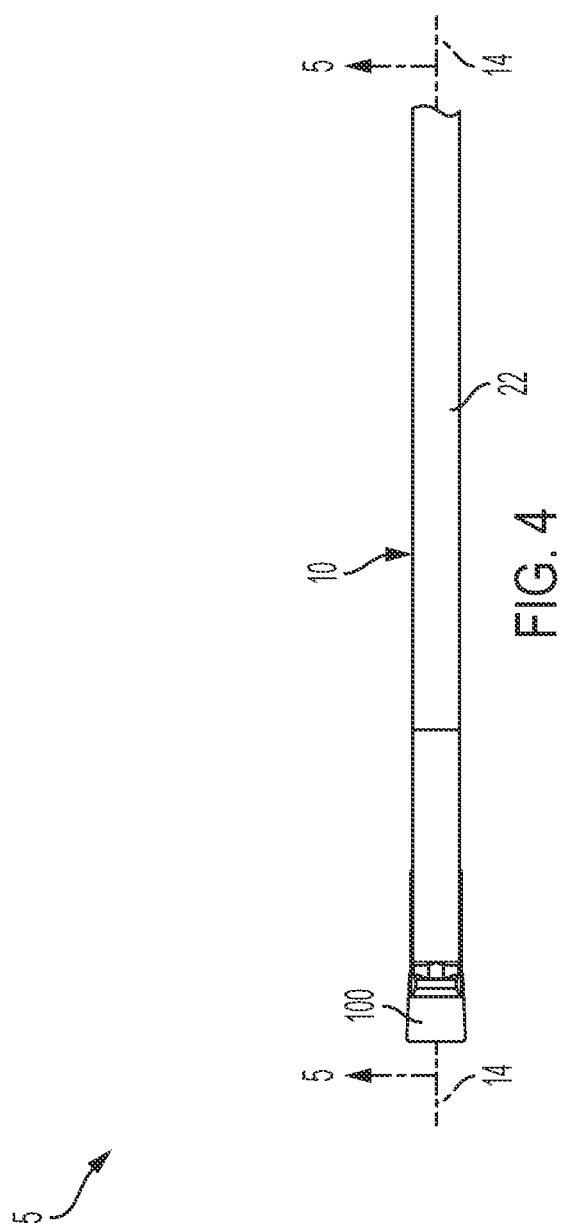

CUTTING TOOL HOLDER WITH IMPROVED DAMPENING EFFECT

CLAIM TO PRIORITY

This application is a continuation application of application Ser. No. 16/916,348, filed on Jun. 30, 2020, the entire contents of which are incorporated herein by reference, which claims priority to Indian Patent Application No. 201941028864, filed on Jul. 17, 2019, the entire contents of which are incorporated herein by reference.

FIELD OF THE INVENTION

The present invention relates to cutting tool holders, and more particularly relates to cutting tool holders with vibration dampening elements.

BACKGROUND INFORMATION

During a metal cutting operation, any vibration between a cutting tool and a workpiece may lead to undesirable cutting performances, such as poor surface finish and out-of-tolerance finished workpieces. The vibration may cause the cutting tool, or the associated machine tool, to become damaged. In addition, the vibration may increase when deep grooving operations are attempted with conventional cutting tool holders.

To reduce vibration in conventional cutting tool holders, the cutting speed can be decreased. However, this approach reduces metal removal rates, thereby negatively impacting productivity. The width of cutting tool holders is often increased to reduced vibration, however this creates a higher material removal rate which leads to higher power consumption and more wasted material.

SUMMARY OF THE INVENTION

Cutting tool holders are provided that include vibration dampening elements. The vibration dampening elements may extend parallel to a longitudinal plane of the cutting tool holder. The vibration dampening elements allow the cutting tool holders to have a smaller width while still providing an increased grooving depth.

An aspect of the present invention is to provide a cutting tool holder comprising a portion of a holder body having a central longitudinal plane comprising opposing first and second side surfaces and a front surface extending therebetween, an insert mounting portion located at the front surface of the holder body adjacent to a top end, at least one dampening aperture extending from the front surface substantially parallel with the central longitudinal plane of the holder body, and at least one vibration dampening element receivable within the at least one dampening aperture.

Another aspect of the present invention is to provide a cutting tool holder comprising a portion of a holder body having a central longitudinal plane comprising opposing first and second side surfaces and a front surface extending therebetween, an insert mounting portion located at the front surface of the holder body adjacent to a top end, a dampening recess extending from the front surface substantially parallel with the central longitudinal plane of the holder body, the dampening recess extending from the first side surface to the second side surface of the holder body, and a vibration dampening assembly receivable within the dampening recess.

These and other aspects of the present invention will be more apparent from the following description.

BRIEF DESCRIPTION OF THE DRAWINGS

FIG. 1 is an isometric view of a cutting tool holder in accordance with an embodiment of the present invention.

FIG. 2 is a side view of the cutting tool holder of FIG. 1.

FIG. 3A is a front view of the cutting tool holder of FIG. 1.

FIG. 3B is a magnified front view of a portion FIG. 3A.

FIG. 4 is a top view of the cutting tool holder of FIG. 1.

DETAILED DESCRIPTION

Figure 5:
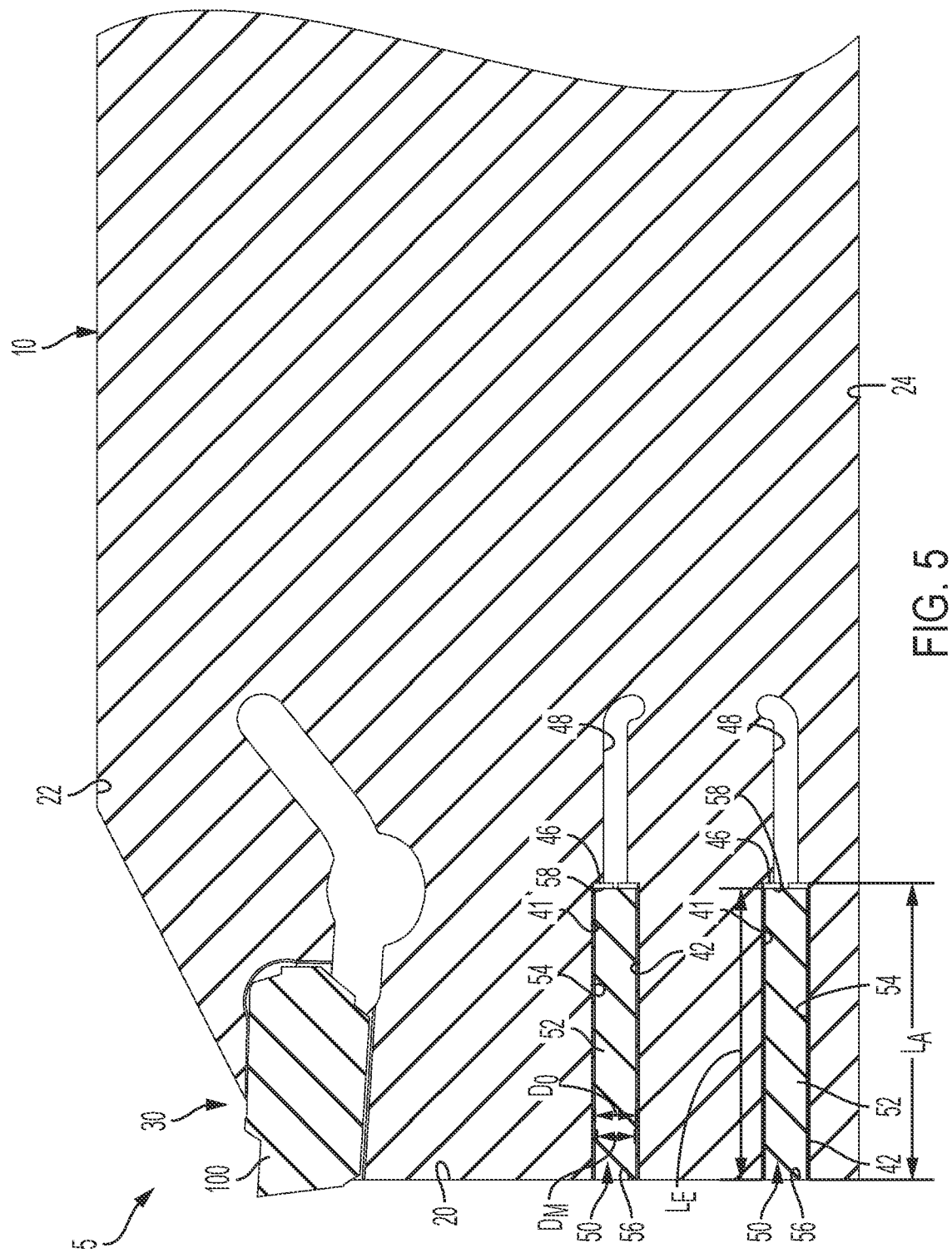
FIG. 5 is a side-sectional view taken through line 5-5 of FIG. 4.

FIG. 1 illustrates a cutting tool holder assembly 5 in accordance with an embodiment of the present invention. The cutting tool holder assembly 5 includes a cutting tool holder 10 and a cutting insert 100. As shown in FIGS. 1 and 3A, the cutting tool holder 10 comprises a holder body 12 with a generally elongated shape symmetrical about a longitudinal bisecting plane 14, and at least one vibration dampening element 50. In the embodiment shown, the cutting tool holder 10 is a cutting tool holder blade, however any suitable cutting tool holder may be used, for example, a screw clamped tool holder or the like. The body 12 of the cutting tool holder 10 has a first substantially planar side surface 16, a second substantially planar side surface 18 and a front surface 20 extending therebetween. In accordance with an embodiment of the present invention, the holder body 12 comprises a cutting portion 30 located at a top end 22 of the front surface 20. As shown in FIGS. 1-5, the cutting portion 30 is structured and arranged to receive the cutting insert 100.

In accordance with an embodiment of the present invention, the cutting tool holder 10 may be symmetrical about the bisecting plane 14. The cutting tool holder 10 being symmetrical about the longitudinal plane 14 may allow the cutting tool holder 10 to be used for different cutting machines or cutting applications. In certain embodiments, the cutting tool holder 10 may have 180 degrees rotational symmetry about a blade axis (not shown) which extends through the center of, and in a direction perpendicular to, the first and second side surfaces 16 and 18. Such construction can allow a cutting tool holder 10 to comprise more than one cutting portion 30.

In accordance with an embodiment of the present invention, the body 12 of the cutting tool holder 10 further comprises a bottom end 24 extending between the first and second side surfaces 16 and 18 opposite the top end 22. In accordance with an embodiment of the present invention, the top and bottom ends 22 and 24 are structured and arranged to allow the cutting tool holder 10 to be mounted in a tool block (not shown). In accordance with an embodiment of the present invention, the top and bottom ends 22 and 24 may be configured to facilitate mounting of the cutting tool holder 10 in a tool block. For example, the top and bottom ends 22 and 24 may be tapered, flat, curved or the like.

As shown in FIG. 3A, the cutting tool holder 10 has a thickness $T_B$ selected to remove a desired amount of material from a work piece while allowing an increased grooving depth. For example, the thickness $T_B$ of the cutting tool holder 10 may typically range from 0.5 to 70 millimeters. In accordance with an embodiment of the present invention, the thickness $T_B$ of the cutting tool holder 10 may be varied depending on the desired width of the cutting insert 100. As shown in FIG. 3A, the thickness of the cutting insert 100 may be greater than the thickness $T_B$ of the cutting tool holder 10.

As shown in FIGS. 1-5, the front surface 20 of the cutting tool holder 10 comprises first and second dampening apertures 40. However, any other suitable number of dampening apertures may be used, e.g., one, three, four or more. In accordance with an embodiment of the present invention, the first and second dampening apertures 40 extend away from the front surface 20 in a direction generally parallel with the longitudinal plane 14 of the cutting tool holder 10. Although the dampening apertures are shown as extending from the front surface 20 of the holder body 12, it is to be understood that the dampening apertures may extend from the top end 22 or the bottom end 24 of the holder body. The first and second dampening apertures 40 are each sized and adapted to receive a vibration dampening element 50. In the embodiment shown, the first and second dampening apertures are the same size. However, any other suitable arrangement may be used, e.g., the first dampening aperture may be smaller or larger than the second dampening aperture.

In accordance with an embodiment of the present invention, the dampening apertures 40 may be located at controlled heights from the bottom end 24 on the front surface 20 of the holder body 12. For example, an upper dampening aperture 40 may be located at or below the midpoint between the top end 22 and the bottom end 24 of the holder body 12, as shown in FIG. 3A. In certain embodiments, a lower dampening aperture 40 may be located closer to the bottom end 24 of the holder body 12 than the upper dampening aperture 40.

As shown in FIGS. 3A, 3B, 5 and 6, the dampening apertures 40 may be hexagonal, however, any other suitable shape of aperture may be used, e.g., cylindrical, rectangular, square, triangular, ovular, prismatic or the like. In accordance with an embodiment of the present invention, the first and second dampening apertures 40 each include a top inner surface 41 and a bottom inner surface 42 spaced by an aperture slot 43. The aperture slot 43 may be configured to allow the top and bottom inner surfaces 41 and 42 of the dampening apertures 40 to adjustably receive the vibration dampening element 50.

In accordance with an embodiment of the present invention, each dampening aperture 40 comprises a dampening element abutment face 46 and an engagement slot 48. The dampening element abutment face 46 may be provided to interact with an end of the vibration dampening element 50 to restrict its relative movement. When the vibration dampening element 50 is inserted into the dampening aperture 40, the engagement slot 48 and the aperture slot 43 allow for the top and bottom surfaces 41 and 42 of the dampening aperture 40 to securely receive the vibration dampening element 50.

In accordance with an embodiment of the present invention, each dampening aperture 40 extends axially inward from the front surface 20. As shown in FIG. 5, each dampening aperture 40 has a length $L_A$ between the front surface 20 of the cutting tool holder 10 and the dampening element abutment face 46 selected to allow the vibration dampening element 50 having a desired length to be received within the dampening aperture 40. In accordance with an embodiment of the present invention, the length $L_A$ may be at least 1 percent of the total length of the cutting tool holder, for example, at least 5 percent, or at least 10 percent, or at least 20 percent of the total length.

As shown in FIGS. 1-3A, 5 and 6, the cutting tool holder assembly 5 comprises two vibration dampening elements 50. In accordance with an embodiment of the present invention, each vibration dampening element 50 may include a high density pin 52 and a dampening sleeve 54. In another embodiment of the present invention, the vibration dampening element 50 may be formed without the high density pin 52 or without the dampening sleeve 54, as further described below. For example, the vibration dampening element 50 may be formed comprising only a high density material or a viscoelastic material. The vibration dampening element 50 comprises a first end 56 and a second end 58. As shown in FIG. 5, when the vibration dampening element 50 is inserted into the dampening aperture 40 the first end 56 is provided adjacent to the front surface 20 of the holder body 12 and the second end 58 may be in contact with or adjacent to the dampening element abutment face 46 of the holder body 12. In accordance with an embodiment of the present invention, interaction between the second end 58 of the vibration dampening element 50 and the dampening element abutment face 46 of the holder body 12 may provide the desired positioning of the vibration dampening element 50 in the holder body 12. Further, engagement between the vibration dampening element 50 and the dampening element abutment face 46 prevents the vibration dampening element 50 from additional axial movement inside the dampening aperture 40.

Figure 6:
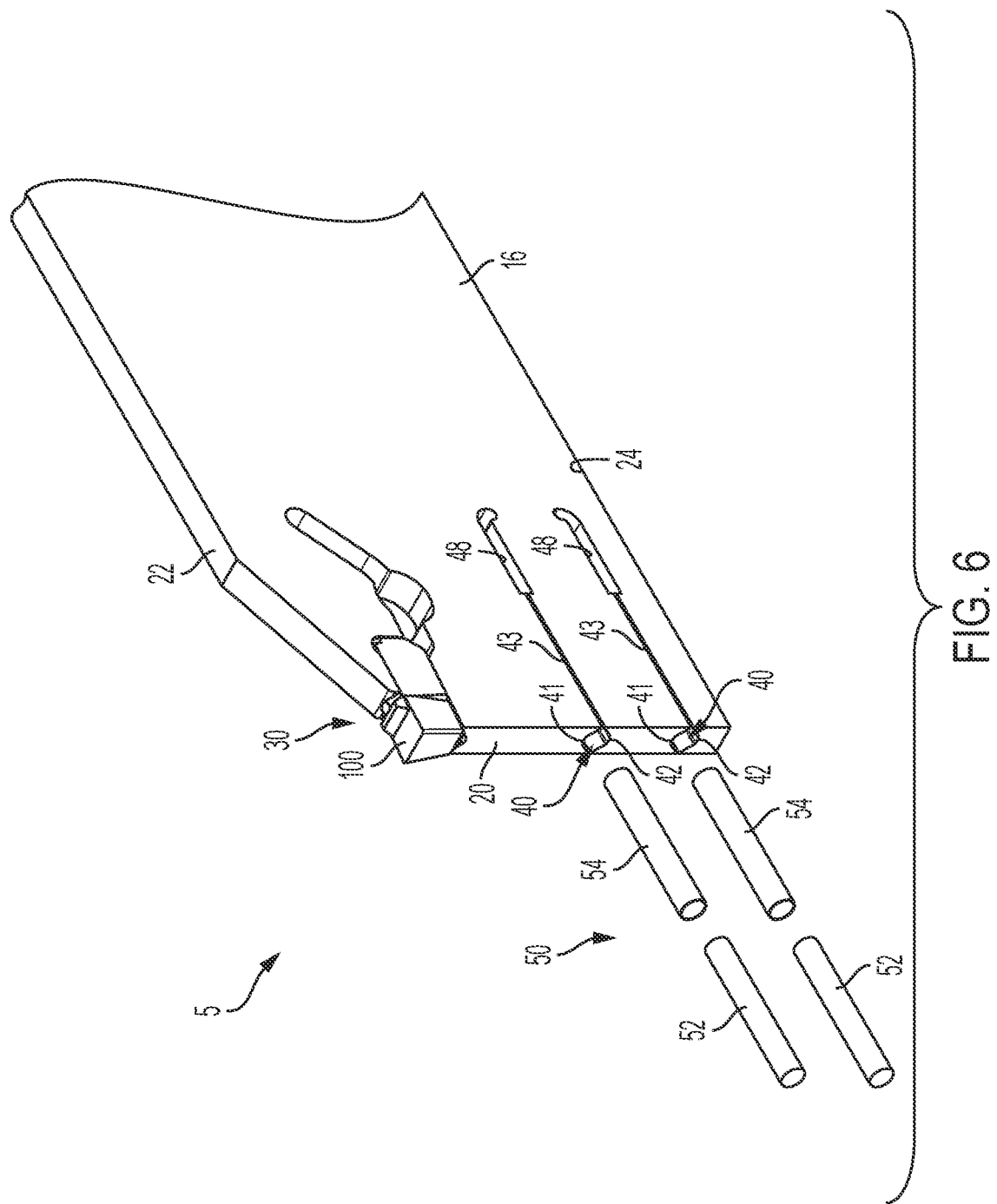
FIG. 6 is an exploded isometric view of the cutting tool holder of FIG. 1.

As shown in FIG. 6, the high density pin 52 and the dampening sleeve 54 may be configured to allow the dampening sleeve 54 to be slideably mounted on the high density pin 52. Alternatively, the high density pin 52 and the dampening sleeve 54 may be fixed in to relation to each other or may be integrally formed.

As shown in FIG. 5, the outer surface of the vibration dampening element forms an outer vibration dampening element diameter $D_O$ and the outer surface of the high density pin 52 forms a high density pin diameter $D_M$ that may be varied depending on the size of the dampening aperture 40. In accordance with an embodiment of the present invention, the outer diameter $D_O$ of the vibration dampening element 50 may be at least 50 percent of the thickness $T_B$ of the cutting tool holder 10. In the embodiment shown, each vibration dampening element 50 comprises the same outer vibration dampening element diameter $D_O$ and high density pin diameter $D_M$. However, any other suitable arrangement may be used, e.g., a first vibration dampening element 50 may have a larger or smaller outer vibration dampening element diameter $D_O$ and/or high density pin diameter $D_M$ than a second vibration dampening element 50.

In accordance with an embodiment of the present invention, the outer diameter $D_O$ of the vibration dampening element 50 is less than or equal the thickness $T_B$ of the cutting tool holder 10. For example, the outer diameter $D_O$ of the vibration dampening element 50 may be at least 50 percent, or at least 60 percent, or at least 75 percent of the thickness $T_B$ of the cutting tool holder 10. In certain embodiments, the high density pin diameter $D_M$ may be at least 75 percent of the outer diameter $D_O$ of the vibration dampening element 50. For example, the diameter $D_M$ of the high density pin 52 may be at least 80 percent, or at least 85 percent, or at least 90 percent, or at least 95 percent of the outer diameter $D_O$ of the vibration dampening element 50. In accordance with an embodiment of the present invention, the diameter of the high density pin 52 may be selected to provide the desired stiffness in the holder body 12. Increasing the stiffness of the holder body 12 is advantageous to control the vibration of the cutting tool holder during cutting operations.

As shown in FIG. 5, the vibration dampening element 50 has an axial length $L_E$ that allows the vibration dampening element 50 to extend along the longitudinal plane 14 of the holder body 12 when inserted in the dampening aperture 40. The axial length $L_E$ of the vibration dampening element 50 is selected to provide increased stiffness to the holder body 12 adjacent to the front surface 20. In accordance with an embodiment of the present invention, the axial length $L_E$ of the vibration dampening element 50 may be at least 1 percent of the total length of the cutting tool holder, for example, at least 5 percent, or at least 10 percent, or at least 20 percent of the total length.

In accordance with an embodiment of the present invention, the axial length $L_E$ of the vibration dampening element 50 is greater than or equal to the outer diameter $D_O$ of the vibration dampening element. For example, the axial length $L_E$ of the vibration dampening element 50 is at least 200 percent greater than, or at least 500 percent greater than, or at least 750 percent greater than, or at least 1,000 percent greater than the outer diameter $D_O$ of the vibration dampening element 50. In certain embodiments, the axial length $L_E$ of the vibration dampening element 50 is at least 200 percent greater than, or at least 500 percent greater than, or at least 750 percent greater than, or at least 1,000 percent greater than the thickness $T_B$ of the cutting tool holder 10. The axial length $L_E$ of the vibration dampening element 50 being greater than or equal to the outer diameter $D_O$ of the vibration dampening element allows the thickness $T_B$ of the cutting tool holder 10 to be minimized while providing increased vibration dampening adjacent to the front surface 20 and the bottom surface 24 of the holder body 14 along the longitudinal plane 14.

In accordance with an embodiment of the present invention, the high density pin 52 may comprise a heavy metal. In accordance with an embodiment of the present invention, the high density pin 52 may have a density of at least 5 g/cm³, for example, the density of the high density pin 52 may typically range from 5 to 20 g/cm³. For example, any suitable heavy metal or similar material can be used for the high density pin 52 of the vibration dampening element 50, such as, tungsten carbide, tungsten copper, cobalt, chromium, iron, lead, nickel, tin, zinc or the like. The density of the high density pin 52 provides the vibration dampening elements 50 with the ability to act as a vibration dampening mass at the front surface 20 of the cutting tool holder 10. In accordance with an embodiment of the present invention, the high density pin 52 of each vibration dampening element 50 may be formed of the same material having similar properties or may be different.

In accordance with an embodiment of the present invention, the dampening sleeve 54 may comprise a viscoelastic material. For example, any suitable viscoelastic material may be used, such as, epoxy resin, rubber, foam, composites or the like. The viscoelastic material of the dampening sleeve 54 provides the vibration dampening elements 50 with the ability to absorb the cutting forces and energy generated by cutting operations.

In accordance with an embodiment of the present invention, the vibration dampening element 50 may be formed from a high density material without the viscoelastic material of the dampening sleeve 54. Alternatively, the vibration dampening element 50 may be formed from a viscoelastic material without the high density material of the high density pin 52. In certain embodiments, a combination of vibration dampening elements 50 comprising different materials may be used. For example, a first vibration dampening element 50 comprising a high density pin 52 and a dampening sleeve 54 and a second vibration element 50 comprising only a high density material, or a first vibration dampening element 50 comprising only a viscoelastic material and a second vibration dampening element 50 comprising only a high density material.

In accordance with an embodiment of the present invention, providing the dampening apertures 40 and the vibration dampening elements 50 along the front surface 20 at or below the midpoint between the top end 22 and the bottom end 24 provides the cutting tool holder 10 with improved vibration dampening. The vibration dampening elements 50 may increase the natural frequency and dynamic stiffness of the cutting tool holder 10.

The vibration dampening elements 50 of the present invention may be fabricated by any suitable technique, such as pressing, molding and/or machining. The cutting tool holder 10 of the present invention may be fabricated by any suitable technique, such as molding and/or machining the dampening apertures 40.

FIGS. 7-12 illustrate a cutting tool holder assembly 105 in accordance with a further embodiment of the present invention. In this embodiment, similar element numbers are used to describe the same features found in the previous embodiment, and the cutting tool holder assembly 105 may be of the same or similar construction as the cutting tool holder assembly 5 described in the previous embodiment.

Figure 7:
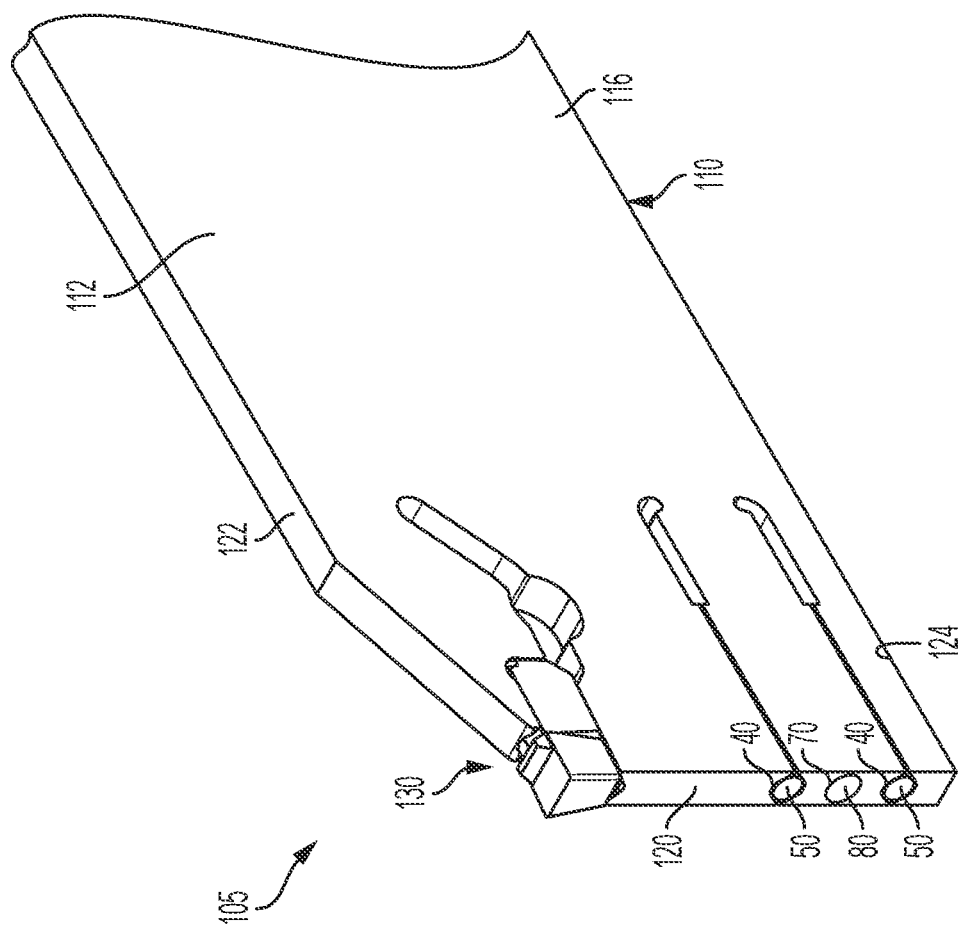
FIG. 7 is an isometric view of a cutting tool holder in accordance with another embodiment of the present invention.
Figure 8:
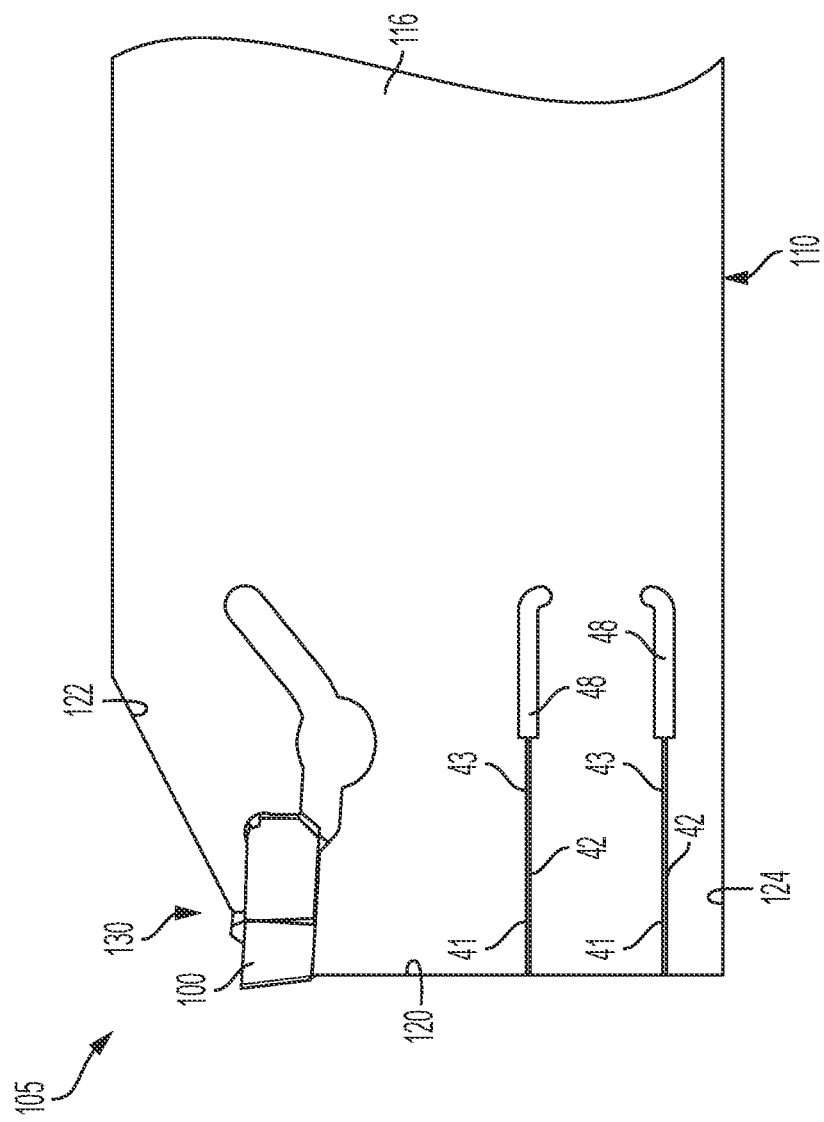
FIG. 8 is a side view of the cutting tool holder of FIG. 7.
Figure 9:
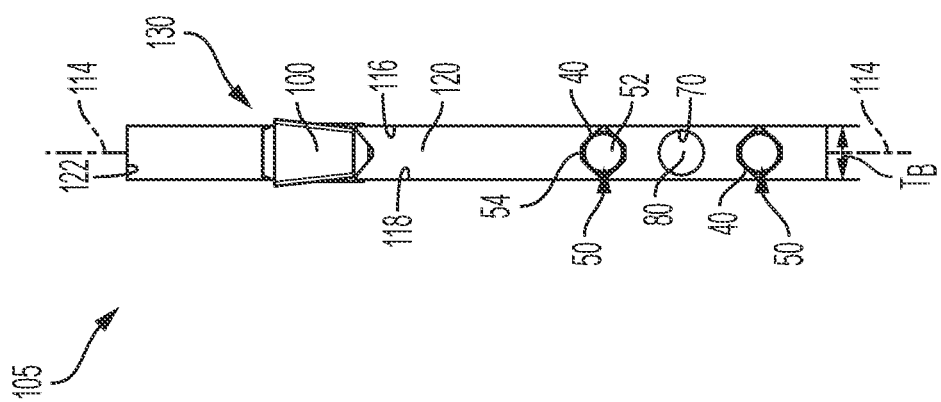
FIG. 9 is a front view of the cutting tool holder of FIG. 7.
Figure 10:
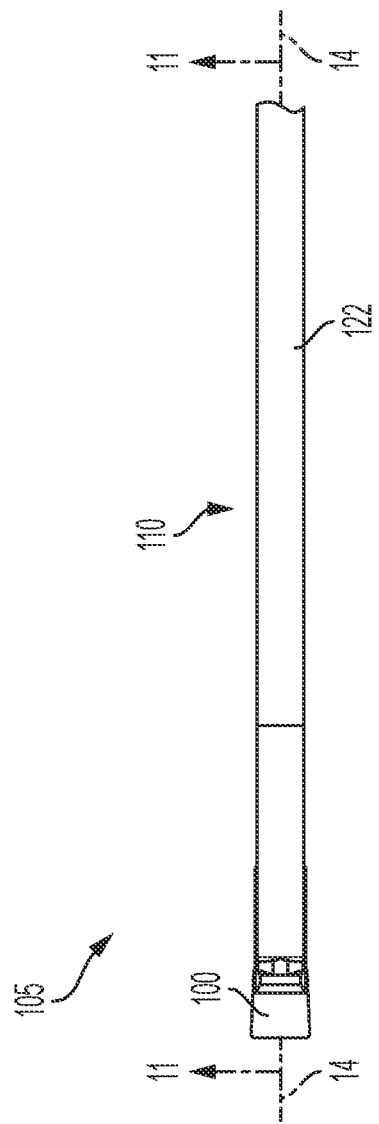
FIG. 10 is a top view of the cutting tool holder of FIG. 7.

As shown in FIGS. 7 and 9, the cutting tool holder assembly 105 includes a cutting tool holder 110 and a cutting insert 100. The cutting tool holder 110 comprises a holder body 112 with a generally elongated shape and a longitudinal plane 114, at least one vibration dampening element 50 and at least one stiffening element 80. In the embodiment shown, the cutting tool holder 110 is a cutting tool holder blade, however any suitable cutting tool holder may be used, for example, a screw clamped tool holder or the like. The body 112 of the cutting tool holder 110 has a first substantially planar side surface 116, a second substantially planar side surface 118 and a front surface 120 extending therebetween. In accordance with an embodiment of the present invention, the holder body 112 comprises a cutting portion 130 located at a top end 122 of the front surface 120. The cutting tool holder 110 further comprises a bottom end 124 extending between the first and second side surfaces 116 and 118 opposite the top end 122.

As shown in FIGS. 7, 9, 11 and 12, the front surface 120 of the cutting tool holder 110 comprises first and second dampening apertures 40 and a stiffening aperture 70. However, any other suitable number of dampening apertures 40 may be used, e.g., zero, one, three, four or more. In the embodiment shown, the cutting tool holder 110 comprises a single stiffening aperture 70, however any other suitable number of stiffening apertures may be used, e.g., zero, two, three, four or more. In accordance with an embodiment of the present invention, the first and second dampening apertures 40 extend away from the front surface 120 in a direction generally parallel with the longitudinal plane 114 of the cutting tool holder 110. The first and second dampening apertures 40 are each sized and adapted to receive a vibration dampening element 50. In the embodiment shown, the stiffening aperture 70 is centrally located between the first and second dampening apertures 40. However, any other suitable arrangement may be used, for example, the stiffening aperture 70 may be located above and/or below the dampening apertures 40. The first and second dampening apertures 40 and the first and second vibration dampening elements 50 may be of the same or similar construction as the dampening apertures and vibration dampening elements in the embodiment shown in FIGS. 1-6.

Figure 11:
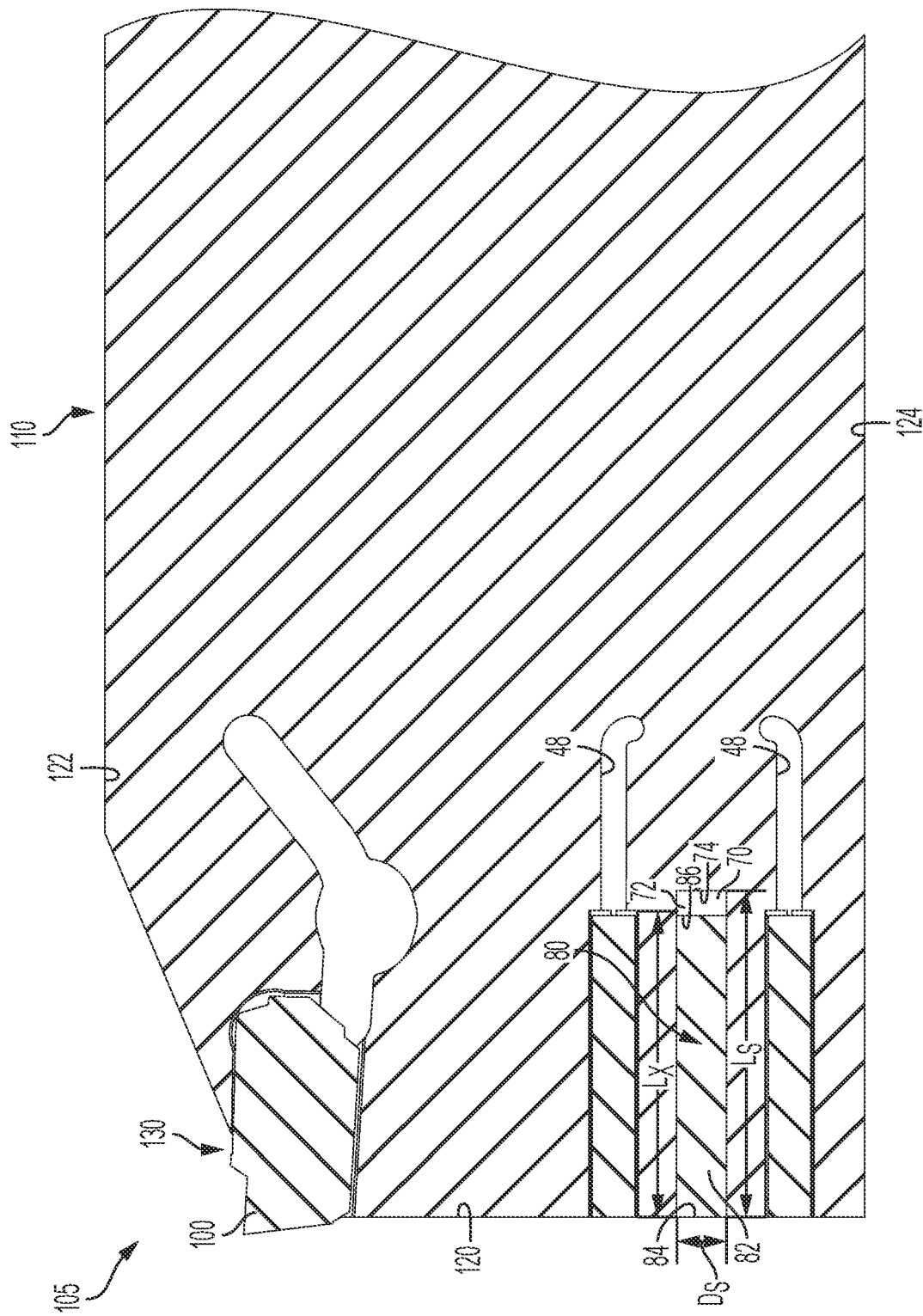
FIG. 11 is a side-sectional view taken through line 11-11 of FIG. 10.
Figure 12:
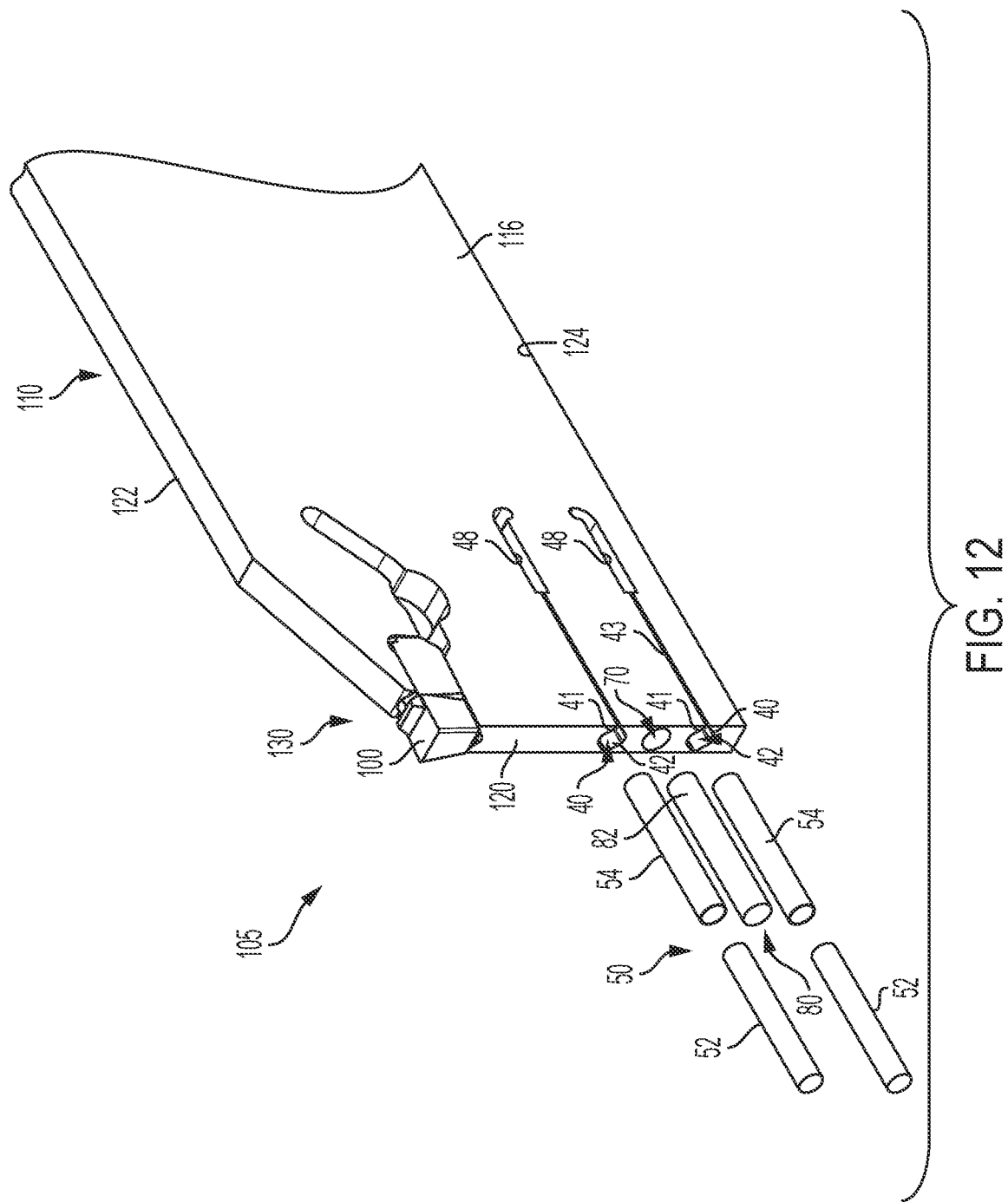
FIG. 12 is an exploded isometric view of the cutting tool holder of FIG. 7.

In accordance with an embodiment of the present invention, the stiffening aperture 70 may be a generally cylindrical opening having an inner surface 72 extending inward from the front surface 120 of the cutting tool holder 110 to a stiffening element abutment face 74. However, any other suitable shape may be used, e.g., hexagonal, rectangular, square, triangular, ovular, prismatic or the like. In the embodiment shown, the stiffening aperture 70 may have a continuous inner surface 72, however, the stiffening aperture 70 may be formed with a slot or gap, as previously described herein. As shown in FIG. 11, the stiffening aperture 70 has a length $L_S$ between the front surface 120 of the cutting tool holder 110 and the stiffening element abutment face 74 selected to allow the stiffening element 80 to be received within the stiffening aperture. In accordance with an embodiment of the present invention, the stiffening aperture 70 and stiffening element 80 are structured and arranged to provide increased stiffness to the cutting tool holder 110. In the embodiment shown, the length $L_S$ of the stiffening aperture 70 is greater than to the lengths $L_A$ of the dampening apertures 40. However, any other suitable arrangement may be used, e.g., the length $L_S$ of the stiffening aperture 70 may be less than or equal to the length $L_A$ of the dampening aperture 40.

In accordance with an embodiment of the present invention, the stiffening element 80 may be of the same or similar construction as the vibration dampening elements 50 in the embodiment shown in FIGS. 1-12. In the embodiment shown, the stiffening element 80 is formed as a high density pin 82. In another embodiment of the present invention, the stiffening element 80 may comprise only a viscoelastic material or a combination of a high density material and a viscoelastic material. The stiffening element 80 comprises a first end 84 and a second end 86. As shown in FIG. 11, when the stiffening element 80 is inserted into the stiffening aperture 40 the first end 84 is provided adjacent to the front surface 120 of the holder body 112 and the second end 86 may be in contact with the stiffening element abutment face 74 of the holder body 112.

As shown in FIG. 11, the outer surface of the stiffening element 80 forms an outer stiffening element 80 diameter $D_S$ that may be varied depending on the size of the stiffening aperture 70. In accordance with an embodiment of the present invention, the outer diameter $D_S$ of the stiffening element 80 may be at least 50 percent of the thickness $T_B$ of the cutting tool holder 110. In the embodiment shown, outer diameter $D_S$ of the stiffening element 80 is greater than the outer diameter $D_O$ of both vibration dampening elements 50. However, any other suitable arrangement may be used, e.g., the outer stiffening element 80 diameter $D_S$ may be less than or equal to the outer diameters $D_O$ of the first and/or second vibration dampening elements 50.

As shown in FIG. 11, the stiffening element 80 has an axial length $L_X$ that allows the stiffening element 80 to extend along the longitudinal plane 14 of the blade body 12 when inserted in the stiffening aperture 70. In the embodiment shown, axial length $L_X$ of the stiffening element 80 is greater than the axial length $L_E$ of both vibration dampening elements 50. However, any other suitable arrangement may be used, e.g., the stiffening element 80 axial length $L_X$ may be less than or equal to the axial length $L_E$ of the first and/or second vibration dampening elements 50.

In accordance with an embodiment of the present invention, the axial length $L_X$ of the stiffening element 80 is greater than or equal to the outer diameter $D_S$ of the stiffening element 80. For example, the axial length $L_X$ of the stiffening element 80 is at least 150 percent greater than, or at least 400 percent greater than, or at least 700 percent greater than, or at least 900 percent greater than the outer diameter $D_S$ of the stiffening element 80. In certain embodiments, the axial length $L_X$ of the stiffening element 80 is at least 150 percent greater than, or at least 400 percent greater than, or at least 700 percent greater than, or at least 900 percent greater than the thickness $T_B$ of the cutting tool holder 10. The axial length $L_X$ of the stiffening element 80 being greater than or equal to the outer diameter $D_S$ of the stiffening element 80 allows the thickness $T_B$ of the cutting tool holder 110 to be minimized while providing increased vibration dampening adjacent to the front surface 120 along the longitudinal plane 114.

In accordance with an embodiment of the present invention, the high density pin 82 of the stiffening element 80 may comprise a heavy metal. In accordance with an embodiment of the present invention, the high density pin 82 may have a density of at least 5 g/cm³, for example, the density of the high density pin 52 may typically range from 5 to 20 g/cm³. For example, any suitable heavy metal or similar material can be used for the high density pin 82 of the stiffening element 80, such as, tungsten carbide, tungsten copper, cobalt, chromium, iron, lead, nickel, tin, zinc or the like. The high density of the high density pin 82 provides the stiffening element 80 with the ability to act as a vibration dampening mass at the front surface 120 of the cutting tool holder 110. In accordance with an embodiment of the present invention, the high density pin 82 of each stiffening element 80 may be formed of the same material as the high density pins 52 of the vibration dampening elements 50 having similar properties or may be different.

The stiffening element 80 of the present invention may be fabricated by any suitable technique, such as molding and/or machining. The cutting tool holder 110 of the present invention may be fabricated by any suitable technique, such as molding and/or machining the dampening apertures 40 and the stiffening apertures 70.

Figure 13:
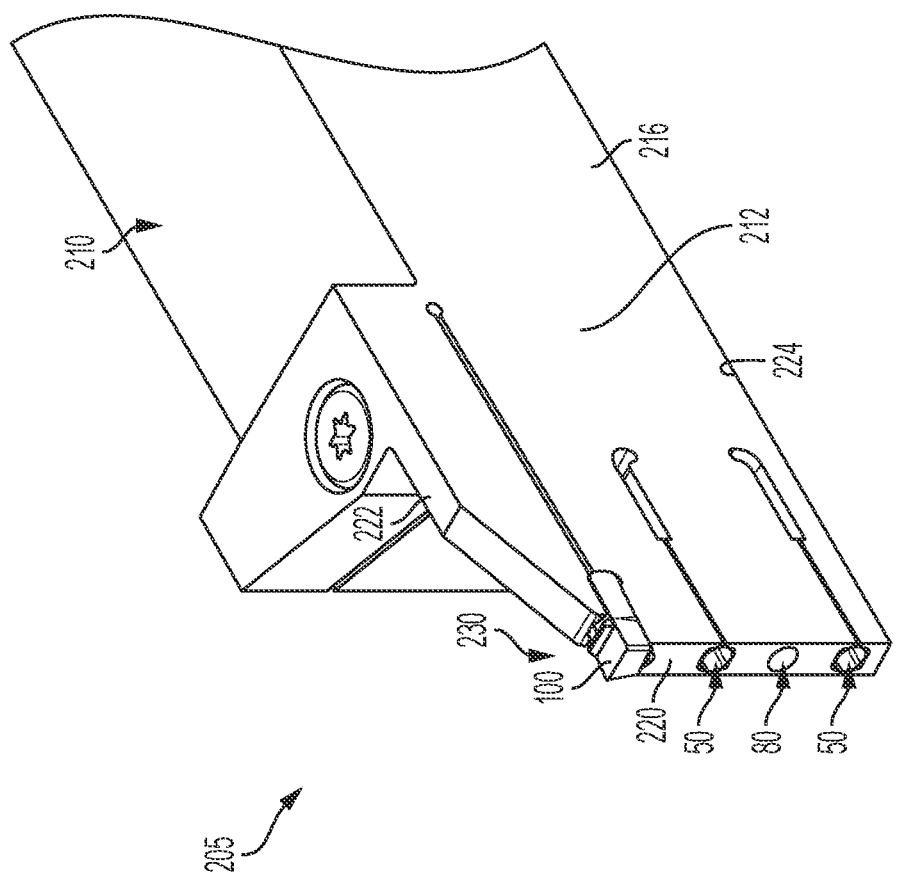
FIG. 13 is an isometric view of a cutting tool holder in accordance with a further embodiment of the present invention.
Figure 14:
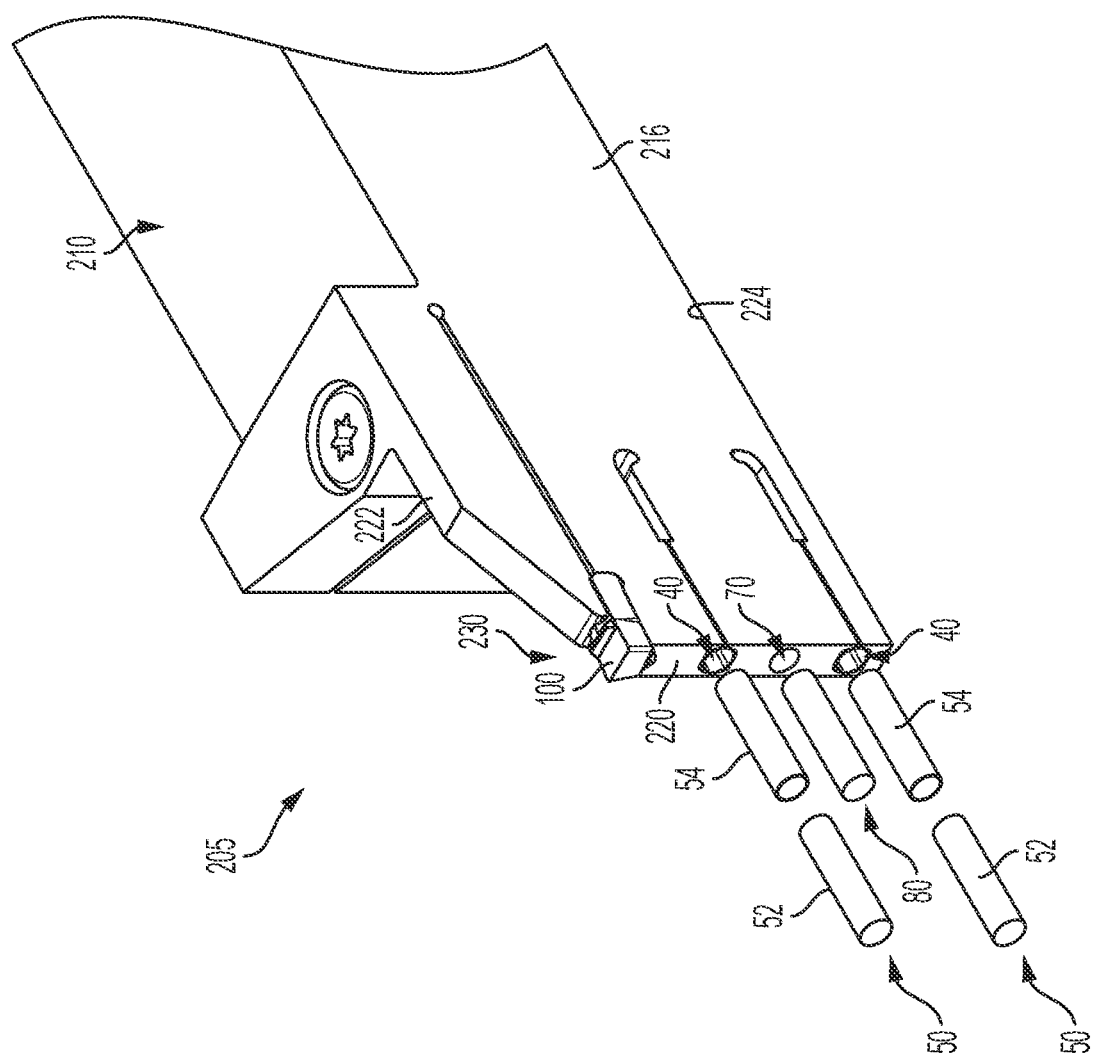
FIG. 14 is an exploded isometric view of the cutting tool holder of FIG. 13.

FIGS. 13 and 14 illustrate a cutting tool holder assembly 205 in accordance with a further embodiment of the present invention. In this embodiment, similar element numbers are used to describe the same features found in the previous embodiments, and the cutting tool holder assembly 205 may be of the same or similar construction as the cutting tool holder assembly 5 and the cutting tool holder assembly 105 described in the previous embodiments. In the embodiment shown, the cutting tool holder 210 is a screw clamped tool holder.

As shown in FIGS. 13 and 14, the cutting tool holder assembly 205 includes a cutting tool holder 210 and a cutting insert 100. The cutting tool holder 210 comprises a holder body 112 with a generally elongated shape, at least one vibration dampening element 50 and at least one stiffening element 80. The body 212 of the cutting tool holder 210 has a first substantially planar side surface 216, a second substantially planar side surface (not shown) and a front surface 220 extending therebetween. In accordance with an embodiment of the present invention, the holder body 212 comprises a cutting portion 230 located at a top end 222 of the front surface 220. The cutting tool holder 210 further comprises a bottom end 224 extending between the first and second side surfaces opposite the top end 222.

As shown in FIGS. 13 and 14, the front surface 220 of the cutting tool holder 210 comprises dampening apertures 40 structured and arranged to receive vibration dampening elements 50 and a stiffening aperture 70 structured and arranged to receive a stiffening element 80. The dampening apertures 40, the vibration dampening elements 50, the stiffening aperture 70 and the stiffening element 80 may be of the same or similar construction as the dampening apertures, the vibration dampening elements, the stiffening aperture and the stiffening element in the embodiment shown in FIGS. 1-12.

FIGS. 15-20 illustrate a cutting tool holder assembly 305 in accordance with another embodiment of the present invention. In this embodiment, similar element numbers are used to describe the same features found in the previous embodiments, and the cutting tool holder assembly 305 may be of the same or similar construction as the cutting tool holder assembly 5, the cutting tool holder assembly 105 and/or the cutting tool holder assembly 205 described in the previous embodiments.

Figure 15:
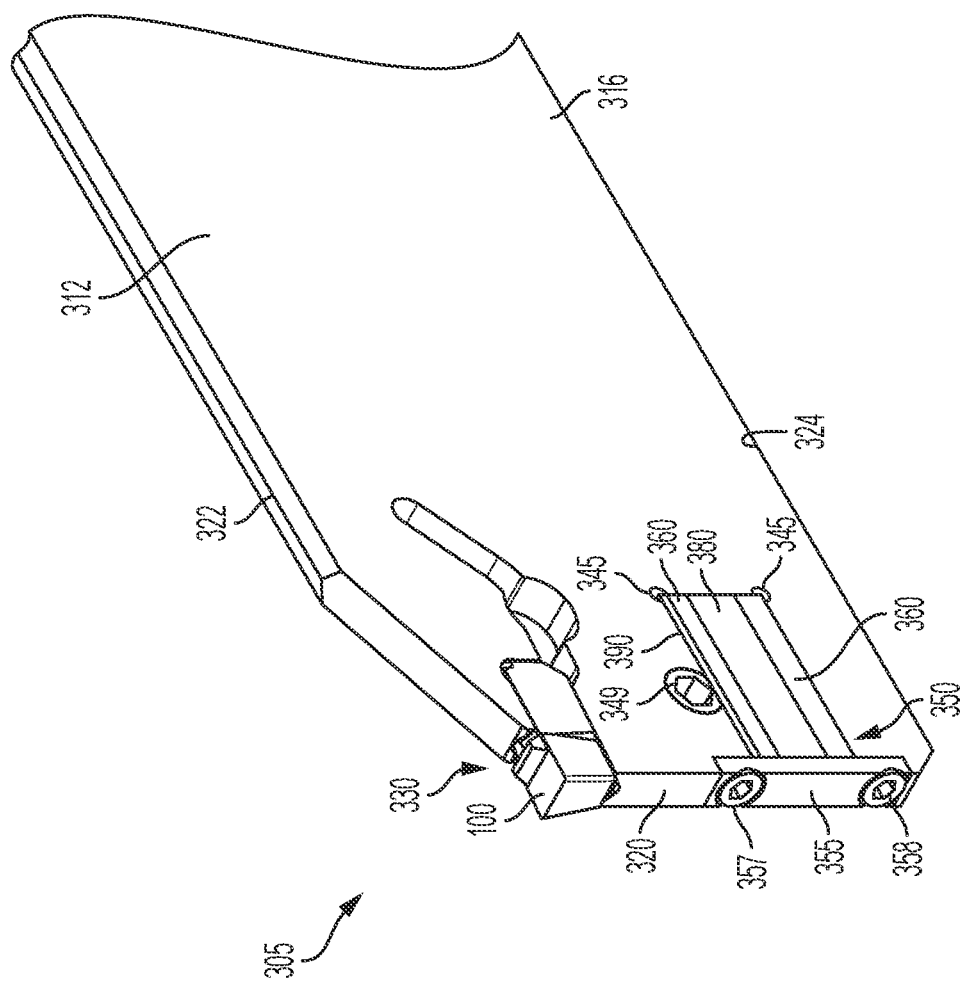
FIG. 15 is an isometric view of a cutting tool holder in accordance with another embodiment of the present invention.
Figure 16:
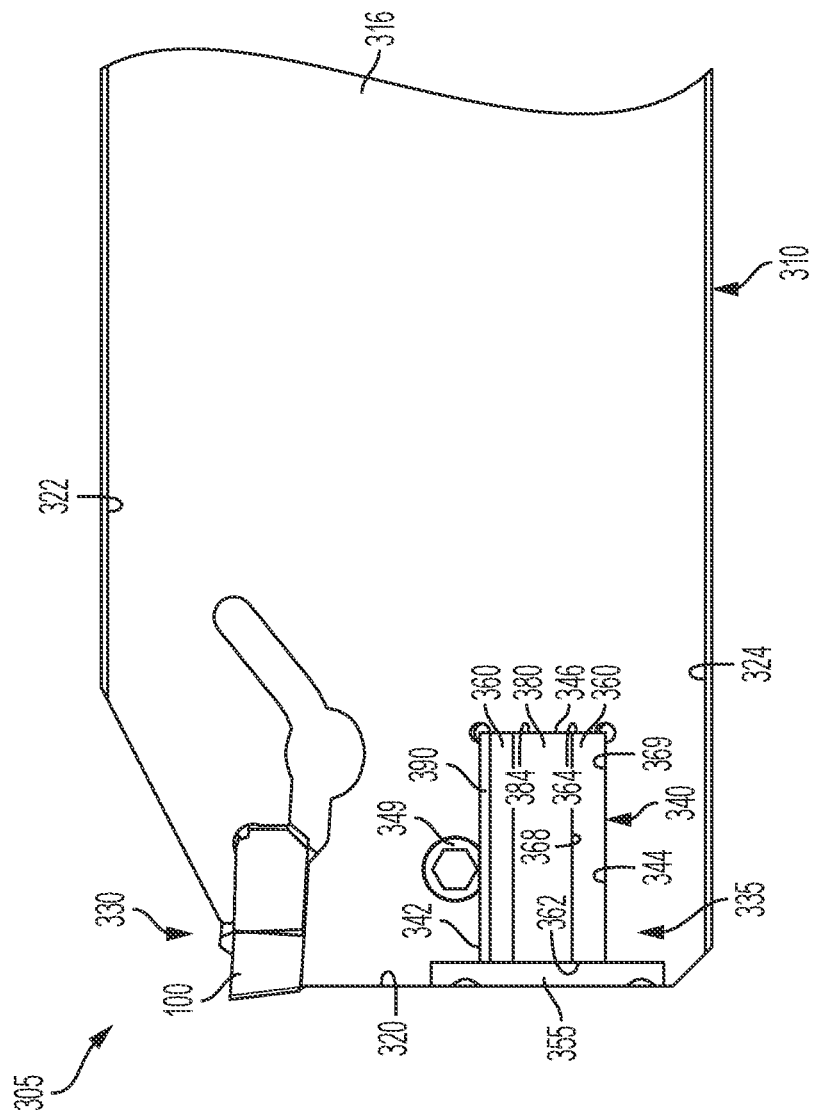
FIG. 16 is a side view of the cutting tool holder of FIG. 15.
Figure 17:
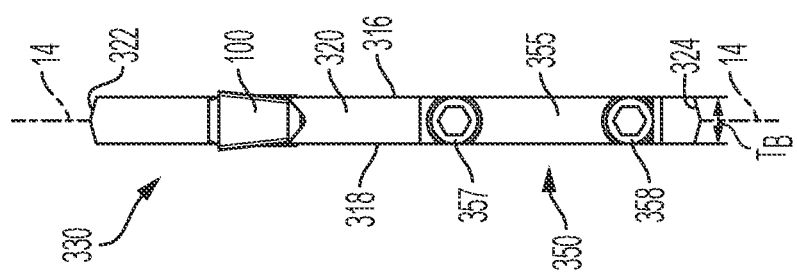
FIG. 17 is a front view of the cutting tool holder of FIG. 15.
Figure 18:
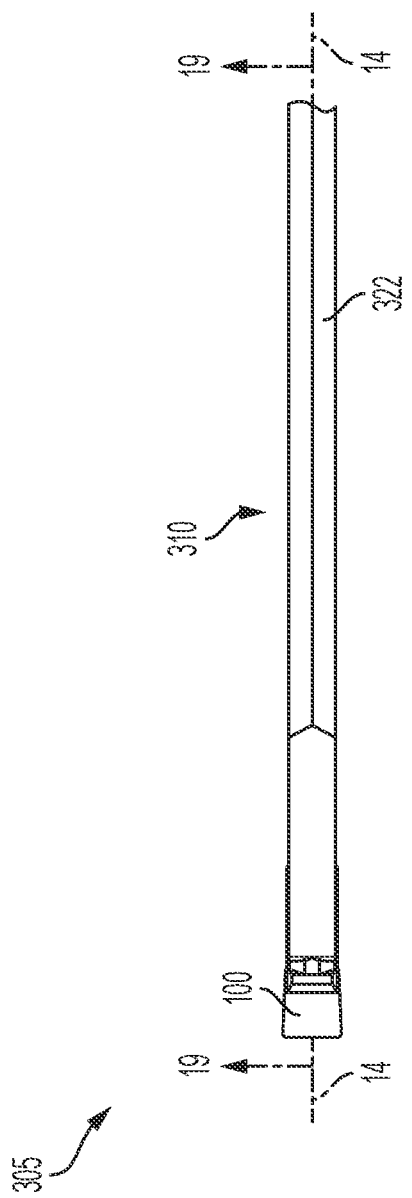
FIG. 18 is a top view of the cutting tool holder of FIG. 15.

As shown in FIGS. 15 and 17, the cutting tool holder 310 comprises a holder body 312 with a generally elongated shape symmetrical about a longitudinal plane 14, and at least one vibration dampening assembly 335. In the embodiment shown, the cutting tool holder 310 is a cutting tool holder blade, however any suitable cutting tool holder may be used, for example, a screw clamped tool holder or the like. The body 312 of the cutting tool holder 10 has a first substantially planar side surface 316, a second substantially planar side surface 318 and a front surface 320 extending therebetween. In accordance with an embodiment of the present invention, the holder body 312 comprises a cutting portion 330 located at a top end 322 of the front surface 320. As shown in FIGS. 15-20, the cutting portion 330 is structured and arranged to receive the cutting insert 100.

In accordance with an embodiment of the present invention, the body 312 of the cutting tool holder 310 further comprises a bottom end 324 extending between the first and second side surfaces 316 and 318 opposite the top end 322. In accordance with an embodiment of the present invention, the top and bottom ends 322 and 324 may have a tapered shape configured to facilitate mounting of the cutting tool holder 310 in a tool block (not shown). However, any other suitable arrangement may be used, e.g., flat, curved or the like.

As shown in FIG. 17, the cutting tool holder 310 has a thickness $T_B$ selected to remove a desired amount of material from a work piece while allowing an increased grooving depth. For example, the thickness $T_B$ of the cutting tool holder 310 may typically range from 0.5 to 70 millimeters. In accordance with an embodiment of the present invention, the thickness $T_B$ of the cutting tool holder 310 may be varied depending on the desired width of the cutting insert 100.

As shown in FIGS. 15-20, the front surface 320 of the cutting tool holder 310 comprises a dampening notch 340. In accordance with an embodiment of the present invention, the dampening notch 340 extends in a direction generally parallel with the longitudinal plane 14 of the cutting tool holder 310. The dampening notch 340 may extend the entire thickness $T_B$ between the first and second side surfaces 316 and 318 of the holder body 312 of the cutting tool holder 310. Although the dampening notch 340 is shown as extending from the front surface 320 of the holder body 312, it is to be understood that the dampening notch may extend from the top end 322 or the bottom end 324 of the holder body. In accordance with an embodiment of the present invention, the dampening notch 340 is structured an arranged to receive dampening elements 360 and stiffening elements 380.

As shown in FIGS. 15, 16, 19 and 20, the dampening notch 340 may be rectangular, however, any other suitable shape of aperture may be used, e.g., cylindrical, hexagonal, square, triangular, ovular, prismatic or the like. In accordance with an embodiment of the present invention, the dampening notch 340 comprises a clamping portion 350 and a dampening portion 341. The clamping portion 350 extends from the front surface 320 to top and bottom clamp shoulders 351 and 352. The dampening portion 341 extends from the top and bottom clamp shoulders 351 and 352 to an abutment face 346. In accordance with an embodiment of the present invention, the dampening portion 341 comprises a top inner surface 342 and a bottom inner surface 344 extending from the top and bottom clamp shoulders 351 and 352 to the abutment face 346. In accordance with an embodiment of the present invention, the dampening portion 341 of the dampening notch 340 may include recessed channels 345 in the corners between the top and bottom inner surfaces 342 and 344 and the abutment face 346. The recessed channels 345 provide an interference clearance for the dampening portion 341 to receive the dampening elements 360 and the stiffening elements 380 of the vibration dampening assembly 335.

In accordance with an embodiment of the present invention, the dampening notch 340 may be located at a controlled height from the bottom end 324 on the front surface 320 of the holder body 312. For example, the top inner surface 342 of the dampening portion 341 may be located at or below the midpoint between the top end 322 and the bottom end 324 of the holder body 312 and the bottom inner surface 344 of the dampening notch may be spaced from the bottom end of the holder body 312, as shown in FIG. 16.

In accordance with an embodiment of the present invention, the top and bottom inner surfaces 342 and 344 of the dampening portion 341 may be provided at an angle with respect to the first and second side surfaces 316 and 318 of the holder body 312. The top and bottom inner surfaces 342 and 344 of the dampening portion 341 being provided at an angle may allow the dampening elements 360 and the stiffening elements 380 to be more rigidly clamped in the dampening portion 341, as further described below. Alternatively, the top inner surface 342 and/or the bottom inner surface 344 of the dampening portion 341 may be normal to the first and second side surfaces 316 and 318 of the holder body 312.

Figure 19:
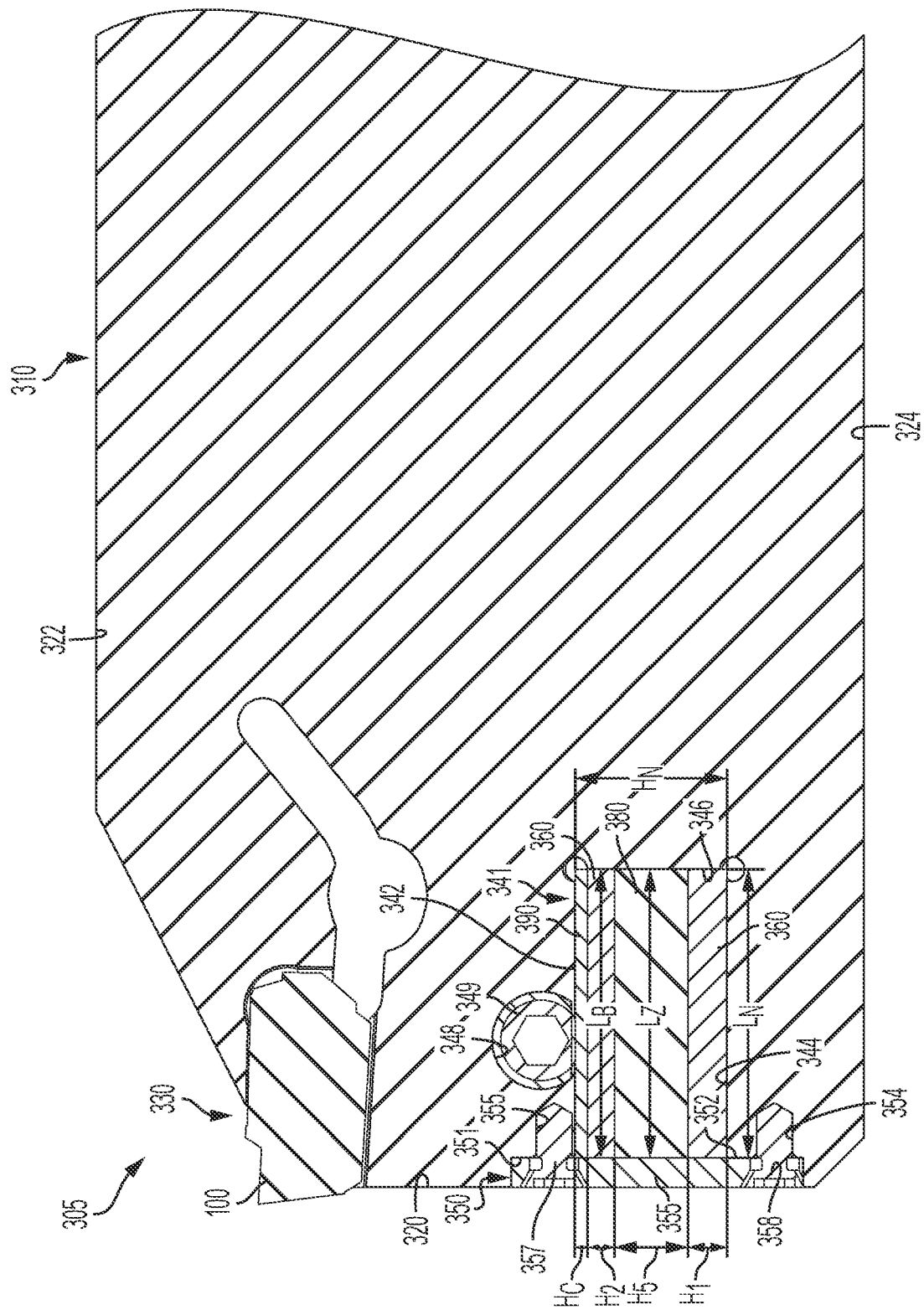
FIG. 19 is a side-sectional view taken through line 19-19 of FIG. 18.

In accordance with an embodiment of the present invention, the dampening notch 340 extends axially inward from the front surface 320. As shown in FIG. 19, the dampening portion 341 of the dampening notch 340 has a length $L_N$ between the top and bottom clamp shoulders 351 and 352 of the cutting tool holder 310 and the abutment face 346 and a height $H_N$ between the top and bottom inner surfaces 342 and 344 selected to allow the dampening elements 360 and stiffening elements 380 having a desired size to be received within the dampening notch 340.

As shown in FIGS. 15-16, 19 and 20, the dampening portion 341 of the dampening notch 340 receives two dampening elements 360, a stiffening element 380 and a clamping element 390 of the vibration dampening assembly 335. In the embodiment shown, the stiffening element 380 is provided between a first dampening element 360 and a second dampening element 360, and the clamping element 390 is located between the second dampening element 360 and the top inner surface 342 of the dampening portion 341. However, any other suitable arrangement of dampening elements 360, stiffening elements 380 and clamping elements 390 may be used, e.g., the dampening element may be provided between first and second stiffening elements, a single dampening element and a single stiffening element, or the like. Any other suitable number of dampening elements 360, stiffening elements 380 and clamping elements 390 may be used, e.g., one, two, three, four or more dampening elements 360, stiffening elements 380 and/or clamping elements 390 may be clamped in the dampening notch 340. In the embodiment shown, the dampening elements 360, stiffening elements 380 and/or clamping elements 390 are provided as separate pieces, however, any other suitable arrangement may be used, e.g., a dampening element 360 may be integrally formed with or bonded to a stiffening element 380 and/or clamping element 390.

In accordance with an embodiment of the present invention, each dampening element 360 and stiffening element 380 may be generally rectangular, however, any other suitable shape of dampening element and/or stiffening element 380 may be used, e.g., square, triangular, circular, prismatic or the like. Each dampening element 360 and stiffening element 380 have a height, width and length that may be varied depending on the size of the dampening aperture 340. In accordance with an embodiment of the present invention, a vibration dampening element 360 may be formed comprising a viscoelastic material and/or a high density material. In certain embodiments, each dampening element 360 comprises a first end 362, a second end 364, a first side surface 366, a second side surface 367, a top surface 368 and a bottom surface 369. In accordance with an embodiment of the present invention, a stiffening element 380 may be formed comprising a viscoelastic material and/or a high density material. Each stiffening element 380 comprises a first end 382, a second end 384, a first side surface 386, a second side surface 387, a top surface 388 and a bottom surface 389.

As shown in FIGS. 16 and 19, when dampening element 360 is inserted into the dampening notch 340 the first end 362 is provided adjacent to the front surface 320 of the holder body 312 and the second end 364 may be in contact with the dampening element abutment face 346 of the holder body 312. In accordance with an embodiment of the present invention, contact between the second end 364 of the dampening element 360 and the dampening element abutment face 346 of the holder body 312 provides the desired positioning of the dampening element 360 in the holder body 312. When the stiffening element 380 is inserted into the dampening notch 340 the first end 382 is provided adjacent to the front surface 320 of the holder body 312 and the second end 384 may be in contact with the dampening element abutment face 346 of the holder body 312. In accordance with an embodiment of the present invention, contact between the second end 384 of the stiffening element 380 and the dampening element abutment face 346 of the holder body 312 provides the desired positioning of the stiffening element 380 in the holder body 312.

In the embodiment shown, the bottom surface 369 of the dampening element 360 is configured to engage with the bottom inner surface 344 of the dampening portion 341. For example, the bottom surface 369 of the dampening element(s) 360 may be provided at an angle to allow the dampening element to contact the bottom inner surface 344 of the dampening portion 341. The angles of the bottom surface 369 of the dampening element(s) 360 and the bottom inner surface 344 and the top inner surface 342 of the dampening portion 341 enable proper and consistent alignment of the dampening elements 360 and stiffening elements 380 in the dampening notch 340. In accordance with an embodiment of the present invention, the dampening elements 360, the stiffening elements 380 and/or the clamping elements 390 may be structured and arranged to cause a self-locking wedge effect. For example, the dampening elements 360, the stiffening elements 380 and/or the clamping elements 390 may be structured and arranged to mate with each other and the surfaces of the dampening portion 341 to provide proper and consistent alignment of the dampening elements 360, the stiffening elements 380 and/or the clamping elements 390 of the dampening assembly 335. The bottom inner surface 344 and the top inner surface 342 of the dampening portion 341 may allow the dampening elements 360, the stiffening elements 380 and/or the clamping elements 390 of the dampening assembly 335 to be efficiently and effectively secured and clamped in the dampening notch 340.

In accordance with an embodiment of the present invention, the distance between the first and second side surfaces 366 and 367 of the dampening element 360 forms the width of the dampening element 360, and the distance between the first and second side surfaces 386 and 387 of the dampening element 360 forms the width of the stiffening element 380. The widths of the dampening element 360 and the stiffening element 380 may be varied depending on the size of the dampening notch 340 and the thickness $T_B$ of the tool holder 310. In accordance with an embodiment of the present invention, the width of the dampening elements 360 and the stiffening elements 380 may be equal to the thickness $T_B$ of the cutting tool holder 310. Alternatively, the width of the dampening elements 360 and the stiffening elements 380 may be greater than or less than the thickness $T_B$ of the cutting tool holder 310. In the embodiment shown, the first and second dampening elements 360 and the stiffening element 380 have equal widths. However, any other suitable arrangement may be used, e.g., a first dampening element 360 may have a larger or smaller width than a second dampening element 360 and/or the stiffening elements 380 may have a larger or smaller width than either the first dampening element and/or a second dampening element 360.

As shown in FIG. 19, each dampening element 360 has an axial length $L_B$ that allows the dampening elements 360 to extend along the longitudinal plane 14 of the holder body 312 when inserted in the dampening notch 340. The axial length $L_B$ of the dampening element 360 is selected to provide the ability to absorb the cutting forces and energy in the dampening portion 341 of the dampening notch 340 of the holder body 312 adjacent to the front surface 320. As shown in FIG. 19, the stiffening element 380 has an axial length $L_Z$ that allows the stiffening element to extend along the longitudinal plane 14 of the holder body 312 when inserted in the dampening notch 340. The axial length $L_Z$ of the stiffening element 380 is selected to provide increased stiffness to the dampening portion 341 of the dampening notch 340 of the holder body 312 adjacent to the front surface 320. In the embodiment shown, the first and second dampening elements 360 have an axial length $L_B$ and the stiffening element 380 has a length $L_Z$ that are equal to the length $L_N$ of the dampening portion 341 of the dampening notch 340. However, the axial length $L_B$ of the first and second dampening elements 360 and the axial length $L_Z$ of the stiffening element 380 may be less than or greater than the length $L_N$ of the dampening portion 341 of the dampening notch 340.

As shown in FIG. 19, the first dampening element 360 adjacent to the bottom inner surface 344 of the dampening portion 341 has a height $H_1$, the second dampening element 360 has a height $H_2$ and the stiffening element 380 has a height $H_S$. The height $H_1$ of the first dampening element 360 and the height $H_2$ of the second dampening element 360 are selected to provide the ability to absorb the cutting forces and energy in the dampening portion 341 of the dampening notch 340 of the holder body 312 adjacent to the front surface 320. The height $H_S$ of the stiffening element 380 is selected to provide increased stiffness to the dampening portion 341 of the dampening notch 340 of the holder body 312 adjacent to the front surface 320. In the embodiment shown, the height $H_1$ of the first dampening element 360 is greater than the height $H_2$ of the second dampening element 360. However, the height $H_1$ of the first dampening element 360 may be less than or equal to the height $H_2$ of the second dampening element 360. In the embodiment shown, the height $H_S$ of the stiffening element 380 is greater than the height $H_1$ of the first dampening element 360 and the height $H_2$ of the second dampening element 360. However, the height $H_S$ of the stiffening element 380 may be less than or equal to the height $H_1$ of the first dampening element 360 and/or the height $H_2$ of the second dampening element 360.

In accordance with an embodiment of the present invention, the height $H_S$ of the stiffening element 380 is at least 25 percent greater than, or at least 50 percent greater than, or at least 100 percent greater than the height $H_1$ of the first dampening element 360 or the height $H_2$ of the second dampening element 360. In certain embodiments, the axial length $L_Z$ of the stiffening element 380 is at least 50 percent greater than, or at least 100 percent greater than, or at least 200 percent greater than, or at least 225 percent greater than the height $H_S$ of the stiffening element.

In accordance with an embodiment of the present invention, the clamping element 390 may allow the dampening elements 360, stiffening elements 380 and/or clamping elements 390 to be clamped and/or compressed in the dampening notch 340. As shown in the FIGS. 16 and 19, the top inner surface 342 of the dampening portion 341 may have a threaded clamping hole 348 configured to receive a clamping screw 349. In the embodiment shown, the dampening portion 341 includes a single threaded clamping hole 348 and clamping screw 349. However, any other suitable number of threaded clamping holes 348 and clamping screws 349 may be used, e.g., two, three, four or more. In accordance with an embodiment of the present invention, the clamping screw 349 may be rotated in the threaded clamping hole 348 after the dampening elements 360, stiffening elements 380 and/or clamping elements 390 are inserted into the dampening notch 340. In certain embodiments, a planar portion of the clamping screw 349 contacts the clamping element 390 to clamp and/or compress the elements in the dampening portion 341. The threaded clamping hole 348 may be oriented to allow the clamping screw 349 to be forced against the clamping element 390.

Figure 20:
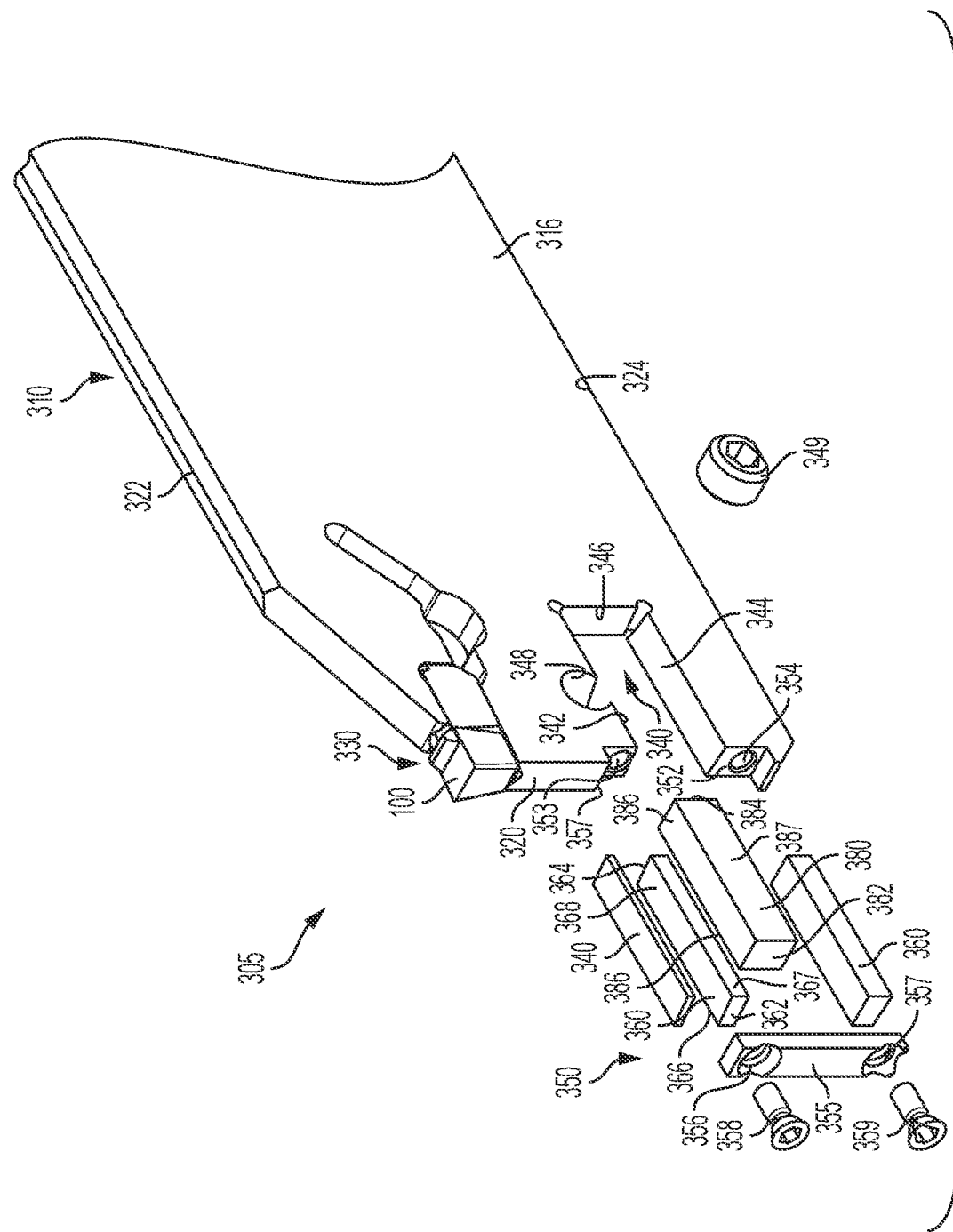
FIG. 20 is an exploded isometric view of the cutting tool holder of FIG. 15.

As shown in FIGS. 15-17, 19 and 20, after the dampening elements 360, stiffening elements 380 and/or clamping elements 390 are inserted into the dampening notch 340, a clamping cover 355 may be secured in the clamping portion 350 of the dampening notch 340. In accordance with an embodiment of the present invention, the clamping cover 355 may include non-thread threaded clamping holes 356 and 357. However, in accordance with embodiments of the present invention, the clamping holes 356 and 357 of the clamping cover 355 may be threaded. As shown in FIGS. 19 and 20, the top and bottom clamp shoulders 351 and 352 may include threaded holes 353 and 354 structured and arranged to receive clamping screws 358 and 359. The clamping cover 355 secures the dampening elements 360, stiffening elements 380 and/or clamping elements 390 in the dampening notch 340 to form the dampening assembly 335. The engagement of the clamping cover 355 in the clamping portion 350 with the clamping screws 358 and 359 secures the dampening assembly 335 in the dampening notch 350. However, any other suitable shape and arrangement of engagement between the clamping cover 355 and the clamping portion 350 may be used, e.g., pins, mechanical fasteners, clamps, snap-fit, adhesives, or the like.

In accordance with an embodiment of the present invention, the stiffening element 380 may comprise a heavy metal. In accordance with an embodiment of the present invention, the stiffening element 380 may have a density of at least 5 g/cm$^3$, for example, the density of the stiffening element 380 may typically range from 5 to 20 g/cm$^3$. For example, any suitable heavy metal or similar material can be used for the stiffening element 380, such as, tungsten carbide, tungsten copper, cobalt, chromium, iron, lead, nickel, tin, zinc or the like. The high density of the stiffening element 380 provides the ability to act as a vibration dampening mass at the front surface 320 of the cutting tool holder 310.

In accordance with an embodiment of the present invention, the dampening elements 360 may comprise a viscoelastic material. For example, any suitable viscoelastic material may be used, such as, epoxy resin, rubber, foam, composites or the like. The viscoelastic material of the dampening elements 360 provides the dampening notch 340 with the ability to absorb the cutting forces and energy generated by cutting operations. In accordance with an embodiment of the present invention, the clamping elements 390 may be made of any suitable conventional material, such as steel, tool steel, stainless steel, aluminum or any other material having sufficient strength.

The dampening elements 360, stiffening elements 380 and/or clamping elements 390 of the present invention may be fabricated by any suitable technique, such as molding and/or machining. The cutting tool holder 310 of the present invention may be fabricated by any suitable technique, such as molding and/or machining the dampening notch 340.

Figure 21:
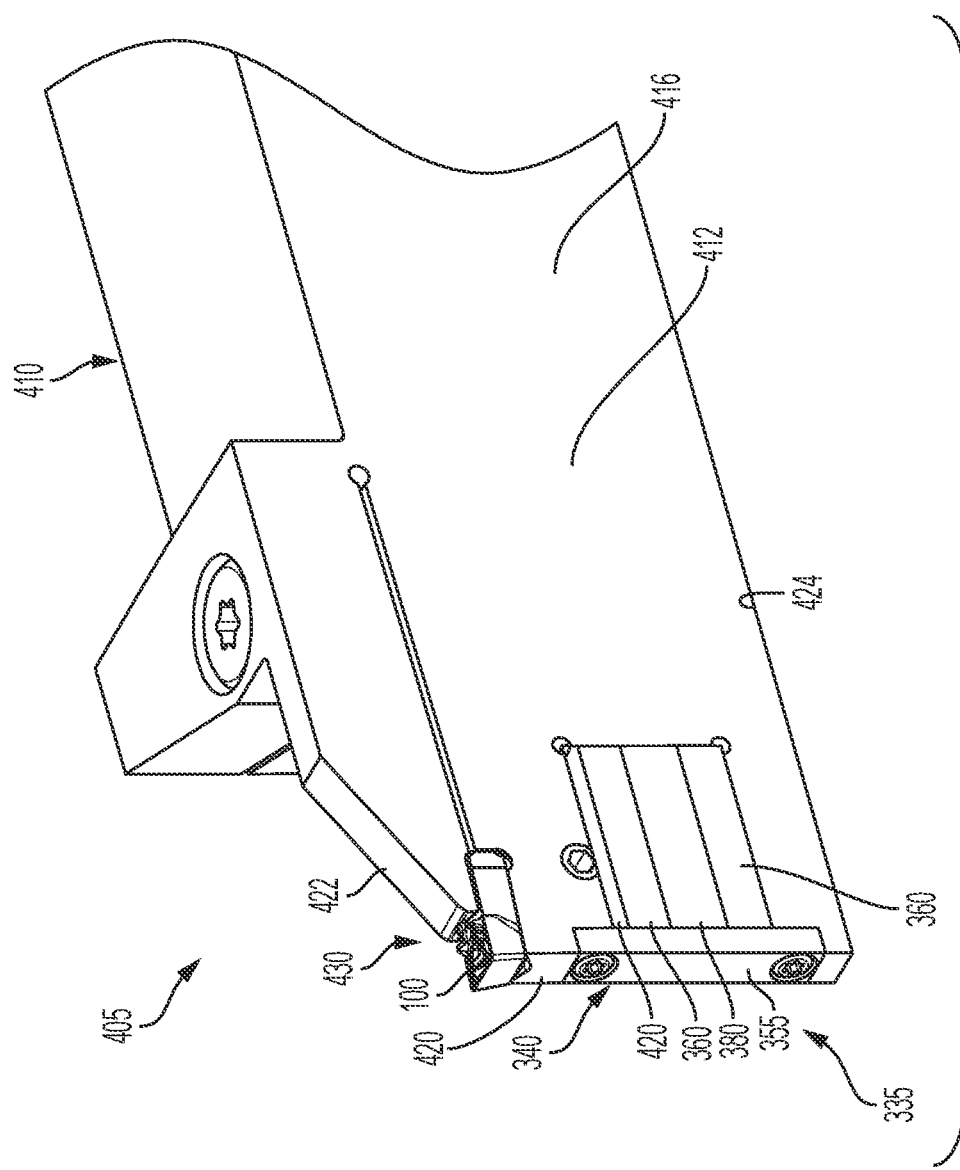
FIG. 21 is an isometric view of a cutting tool holder in accordance with a further embodiment of the present invention.
Figure 22:
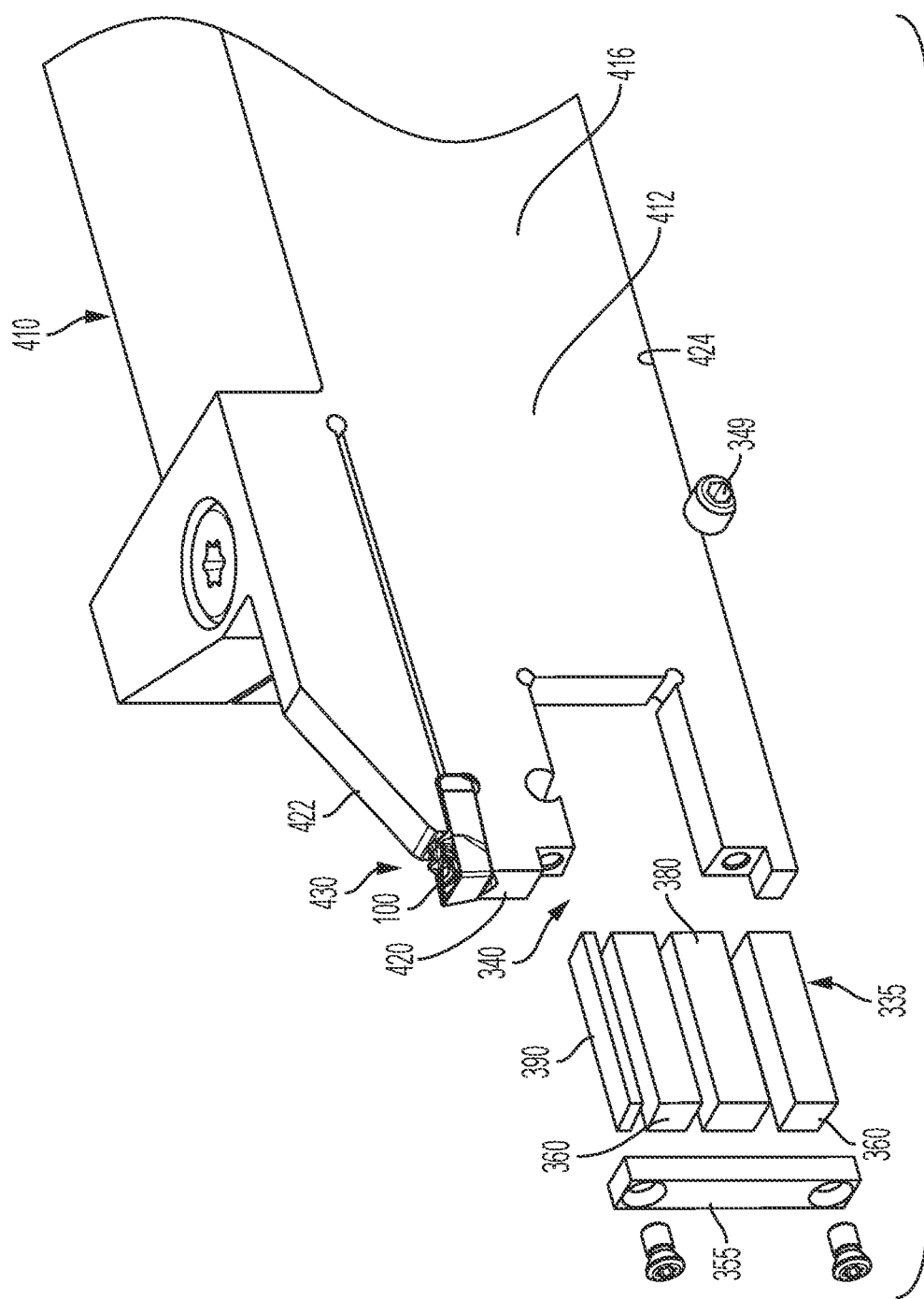
FIG. 22 is an exploded isometric view of the cutting tool holder of FIG. 21.

FIGS. 21 and 22 illustrate a cutting tool holder assembly 405 in accordance with a further embodiment of the present invention. In this embodiment, similar element numbers are used to describe the same features found in the previous embodiments, and the cutting tool holder assembly 405 may be of the same or similar construction as the cutting tool holder assembly 305 described in the previous embodiment. In the embodiment shown, the cutting tool holder 410 is a screw clamped tool holder.

As shown in FIGS. 21 and 22, the cutting tool holder assembly 405 includes a cutting tool holder 410 and a cutting insert 100. The cutting tool holder 410 comprises a holder body 412 with a generally elongated shape, at least one vibration dampening assembly 335. The body 412 of the cutting tool holder 410 has a first substantially planar side surface 416, a second substantially planar side surface (not shown) and a front surface 420 extending therebetween. In accordance with an embodiment of the present invention, the holder body 412 comprises a cutting portion 430 located at a top end 422 of the front surface 420. The cutting tool holder 410 further comprises a bottom end 424 extending between the first and second side surfaces opposite the top end 422.

As shown in FIGS. 21 and 22, the front surface 420 of the cutting tool holder 410 comprises a dampening notch 340 structured and arranged to receive dampening elements 360, stiffening elements 380 and a clamping element 390. The dampening notch 340, the dampening elements 360, the stiffening elements 380 and the clamping element 390 may be of the same or similar construction as the dampening notch 340, the dampening elements 360, the stiffening elements 380 and the clamping element 390 in the embodiment shown in FIGS. 15-20.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

For purposes of the description above, it is to be understood that the invention may assume various alternative variations and step sequences except where expressly specified to the contrary. Moreover, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A cutting tool holder comprising:
   a holder body comprising:
   a top surface, a bottom surface opposite to the top surface, a first side surface, a second side surface and a front surface extending therebetween a longitudinal plane extending parallel to the first and second side surfaces;
   a cutting portion, including an insert pocket, located at a top end of the front surface of the holder body; and
   a dampening notch, spaced apart from the insert pocket, extending axially inward from the front surface and parallel with respect to the longitudinal plane of the cutting tool holder, the dampening notch extending an entire thickness, $T_B$, between the first side surface and the second side surface of the holder body; and
   a vibration dampening assembly disposed in a stacking arrangement within the dampening notch, the vibration dampening assembly comprising:
   a first dampener having a height, $H_1$, measured in a height direction from the bottom surface to the top surface and parallel to the longitudinal plane of the cutting tool holder;
   a stiffener directly connected to the first dampener and having a height, Hs, measured in the height direction from the bottom surface to the top surface and parallel to the longitudinal plane of the cutting tool holder, the stiffener height, Hs, is greater than the height, $H_1$, of the first dampener; and
   a clamp plate disposed between a top inner surface of the dampening notch and the first dampener.

2. The gear forming tool according to claim 1, wherein at least one of the fluid inlets of the tool holder is a slot-shaped inlet.

3. The cutting tool holder of claim 1, wherein the vibration dampening assembly further comprises a second dampener.

4. The cutting tool holder of claim 3, wherein the stiffener is located between the first dampener and the second dampener.

5. The cutting tool holder of claim 3, wherein the second dampener has a height, $H_2$, measured in the height direction from the bottom surface to the top surface and parallel to the longitudinal plane of the cutting tool holder.

6. The cutting tool holder of claim 5, wherein the height, $H_1$, of the first dampener is different than the height, $H_2$, of the second dampener.

7. The cutting tool holder of claim 4, wherein the height, $H_s$, of the stiffener is different than the height, $H_2$, of the second dampener.

8. The cutting tool holder of claim 7, wherein the height, $H_s$, of the stiffener is at least 25 percent greater than the height, $H_1$, of the first dampener, and wherein the height, $H_s$, of the stiffener is at least 25 percent greater than the height, $H_2$, of the second dampener.

9. The cutting tool holder of claim 4, wherein the top inner surface of the dampening portion includes a threaded clamping hole configured to receive a clamping screw.

10. The cutting tool holder of claim 9, wherein the clamping screw incudes a planar portion for contacting the clamping element to clamp the first dampener, the second dampener and the stiffener in the dampening portion of the dampening notch.

11. The cutting tool holder of claim 2, wherein the first dampener has an axial length, $L_B$, measured in a length direction perpendicular to the height direction and parallel to the longitudinal plane of the cutting tool holder and wherein the stiffener has an axial length, $L_Z$, measured in the length direction.

12. The cutting tool holder of claim 11, wherein the axial length, $L_B$, of the first dampener is equal to an axial length, $L_N$, of the dampening portion of the dampening notch, and wherein the axial length, $L_Z$, of the stiffener is equal to the axial length, $L_N$, of the dampening portion of the dampening notch.

13. The cutting tool holder of claim 11, wherein the axial length, $L_Z$, of the stiffener is at least 50% greater than the height, $H_S$, of the stiffener.

14. The cutting tool holder of claim 1, wherein the entire thickness, $T_B$, of the cutting tool holder is between 0.5 to 70 mm.

15. The cutting tool holder of claim 1, wherein the first dampener is made of viscoelastic material, and the stiffener is made of a metal material.

16. A cutting tool holder comprising:
  a holder body comprising:
    a top surface, a bottom surface opposite to the top surface, a first side surface, a second side surface and a front surface extending therebetween a longitudinal plane extending parallel to the first and second side surfaces;
    a cutting portion, including an insert pocket, located at a top end of the front surface of the holder body; and
    a dampening notch, spaced apart from the insert pocket, extending axially inward from the front surface parallel with respect to the longitudinal plane of the cutting tool holder, the dampening notch extending an entire thickness, $T_B$, between the first side surface and the second side surface of the holder body, the dampening notch including a clamping portion extending from the front surface to a top clamp shoulder and a bottom clamp shoulder, and a dampening portion extending from the first and second clamp shoulders to an abutment face; and
  a vibration dampening assembly disposed in a stacking arrangement within the dampening notch, the vibration dampening assembly comprises:
    a first dampener having a height, $H_1$, measured in a height direction from the bottom surface to the top surface and parallel to the longitudinal plane of the cutting tool holder;
    a second dampener having a height, $H_2$, measured in the height direction from the bottom surface to the top surface and parallel to the longitudinal plane of the cutting tool holder;
    a stiffener disposed between the first dampener and the second dampener, the stiffener directly connected to the first dampener and having a height, Hs, measured in the height direction from the bottom surface to the top surface and parallel to the longitudinal plane of the cutting tool holder, the stiffener height, Hs, being greater than each of the height, $H_1$, of the first dampener, and the height, $H_2$, of the second dampener, and
    a clamp plate disposed between a top inner surface of the dampening portion of the dampening notch and the first dampener.

17. The cutting tool holder of claim 16, wherein the height, $H_1$, of the first dampener is different than the height, $H_2$, of the second dampener.

18. The cutting tool holder of claim 16, wherein an axial length, $L_B$, of the first and second dampeners measured in a length direction perpendicular to the height direction and parallel to the longitudinal plane of the cutting tool holder and an axial length, $L_Z$, of the stiffener measured in the length direction are equal to an axial length, $L_N$, of the dampening portion of the dampening notch.

19. The cutting tool holder of claim 16, wherein the first dampener is made of viscoelastic material, wherein the second dampener is made of viscoelastic material, and wherein the stiffener stiffening elements is made of a metal material.

20. The cutting toolholder of claim 16, further comprising a clamping cover secured in the clamping portion for securing the vibration dampening assembly in the dampening notch.

* * * * *